(12) United States Patent
Nigo et al.

(10) Patent No.: US 10,916,977 B2
(45) Date of Patent: Feb. 9, 2021

(54) STATOR, MOTOR, DRIVING DEVICE, COMPRESSOR, REFRIGERATION AIR CONDITIONER, AND METHOD OF PRODUCING STATOR

(71) Applicant: Mitsubishi Electric Corporation, Tokyo (JP)

(72) Inventors: Masahiro Nigo, Tokyo (JP); Yuji Hirosawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 55 days.

(21) Appl. No.: 16/323,979

(22) PCT Filed: Oct. 11, 2016

(86) PCT No.: PCT/JP2016/080076
§ 371 (c)(1),
(2) Date: Feb. 7, 2019

(87) PCT Pub. No.: WO2018/069956
PCT Pub. Date: Apr. 19, 2018

(65) Prior Publication Data
US 2019/0229564 A1  Jul. 25, 2019

(51) Int. Cl.
*H02K 1/14*  (2006.01)
*H02K 15/02*  (2006.01)
*H02K 1/18*  (2006.01)

(52) U.S. Cl.
CPC ............... *H02K 1/148* (2013.01); *H02K 1/18* (2013.01); *H02K 15/022* (2013.01)

(58) Field of Classification Search
CPC .. H02K 1/00–1/34; H02K 1/148; H02K 1/18; H02K 15/022; H02K 1/02
USPC ................................... 310/216.001–216.137
See application file for complete search history.

(56) References Cited

U.S. PATENT DOCUMENTS

| | | | |
|---|---|---|---|
| 6,960,860 B1 | 11/2005 | DeCristofaro et al. | |
| 2003/0178905 A1* | 9/2003 | Koharagi | H02K 1/2766 310/156.38 |
| 2008/0185932 A1* | 8/2008 | Jajtic | H02K 1/17 310/181 |
| 2013/0278103 A1* | 10/2013 | McPherson | H02K 15/02 310/154.02 |
| 2016/0241092 A1* | 8/2016 | Nigo | H02K 1/12 |

(Continued)

FOREIGN PATENT DOCUMENTS

| | | |
|---|---|---|
| JP | 2002-369418 A | 12/2002 |
| JP | 2003-284314 A | 10/2003 |
| JP | 2006-271114 A | 10/2006 |

(Continued)

OTHER PUBLICATIONS

Machine Translation, Inoue, JP-2010207028-A, Sep. 2010. (Year: 2010).*

(Continued)

*Primary Examiner* — Thomas Truong
(74) *Attorney, Agent, or Firm* — Posz Law Group, PLC

(57) ABSTRACT

A stator includes: a stator core including a first core part formed by at least one first sheet and a second core part provided on a side face of the first core part and formed by at least one second sheet; and a winding wound around an outer periphery of the first core part and the second core part.

20 Claims, 26 Drawing Sheets

(56) References Cited

U.S. PATENT DOCUMENTS

2017/0288476 A1* 10/2017 Fischer ................... H02K 1/24

FOREIGN PATENT DOCUMENTS

| JP | 2010-207028 A | | 9/2010 |
|---|---|---|---|
| JP | 2010207028 A | * | 9/2010 |
| JP | 2011-147200 A | | 7/2011 |
| JP | 2013-039030 A | | 2/2013 |
| JP | 5354780 B2 | | 11/2013 |
| JP | 2014-155347 A | | 8/2014 |
| WO | 2017/208290 A1 | | 12/2017 |
| WO | 2017/208291 A1 | | 12/2017 |
| WO | 2017/208293 A1 | | 12/2017 |

OTHER PUBLICATIONS

Office Action dated Jan. 7, 2020 issued in corresponding JP patent application No. 2018-544588 (and English translation).
U.S. Appl. No. 16/081,704, filed Aug. 31, 2018, Baba et al.
U.S. Appl. No. 16/081,330, filed Aug. 30, 2018, Baba et al.
U.S. Appl. No. 16/082,574, filed Sep. 6, 2018, Baba et al.
Office Action dated May 29, 2020 issued in corresponding CN patent application No. 201680089415.8 (and English translation).
International Search Report of the International Searching Authority dated Nov. 22, 2016 for the corresponding International application No. PCT/JP2016/080076 (and English translation).

* cited by examiner

STATOR, MOTOR, DRIVING DEVICE, COMPRESSOR, REFRIGERATION AIR CONDITIONER, AND METHOD OF PRODUCING STATOR

CROSS REFERENCE TO RELATED APPLICATION

This application is a U.S. national stage application of International Patent Application No. PCT/JP2016/080076 filed on Oct. 11, 2016, the disclosure of which is incorporated herein by reference.

TECHNICAL FIELD

The present invention relates to a stator used for a motor.

BACKGROUND ART

In a stator core formed by combining two types of core parts, if positioning of each core part is not made appropriately, displacement can occur between the core parts and that can affect the performance of a motor. Thus, high dimensional accuracy and shape accuracy are required of fitting parts (engagement parts or concave/convex parts) between the core parts and that has become a factor of the rise in the production cost. Further, in a stator core having structure as a combination of a plurality of core parts, sufficient assembly strength against vibration or external force is necessary and there is still room for improvement in fixation means for these core parts and the like. In order to firmly combine two types of core parts (a first core and a second core), the second core is arranged in a hole formed in a tooth part of the first core in a stator disclosed in Patent Reference 1, for example.

PATENT REFERENCE

Patent Reference 1: Japanese Patent Application Publication No. 2010-207028.

Further, to improve magnetic properties, the Patent Reference 1 proposes employment of a first core and a second core having metal rolling directions (magnetic properties) different from each other and arrangement of the second core in a hole of the first core. However, if the second core is arranged in a hole formed in the first core, a gap is likely to occur between the first core and the second core. In contrast, if the second core is pressed into the hole of the first core so as not to cause a gap between the first core and the second core, magnetic properties of the stator deteriorate due to compressive stress occurring to the first core. When a gap occurs between the first core and the second core, the gap serves as magnetic resistance (obstruction against the flow of magnetic flux in the stator core) and causes local magnetic flux concentration in the stator core or a drop in the flux linkage in a winding. When the local magnetic flux concentration occurs, iron loss increases in the part where the magnetic flux concentration has occurred. When the flux linkage of a winding drops, electric current supplied to the winding so as to maintain the torque of the motor increases, and thus copper loss increases. Especially between core parts formed of materials different from each other (materials having magnetic properties different from each other), there is a difference in magnetic permeability, and thus the difference in the magnetic permeability is encouraged by the gap and the local magnetic flux concentration in the stator core is likely to occur. Accordingly, there is a problem in that it is difficult to obtain excellent magnetic properties in the state in which a gap has occurred between the first core and the second core.

SUMMARY

It is an object of the present invention, which has been made to resolve the above-described problem, to prevent the deterioration in the magnetic properties of the stator.

A stator according to the present invention includes: a stator core including a first core part formed by at least one first sheet and a second core part provided on a side face of the first core part and formed by at least one second sheet; and a winding wound around an outer periphery of the first core part and the second core part. The first core part includes a yoke part and a tooth part, and the second core part adjoins the tooth part in a circumferential direction.

According to the present invention, the deterioration in the magnetic properties of the stator can be prevented.

DESCRIPTION

First Embodiment

Figure 1:
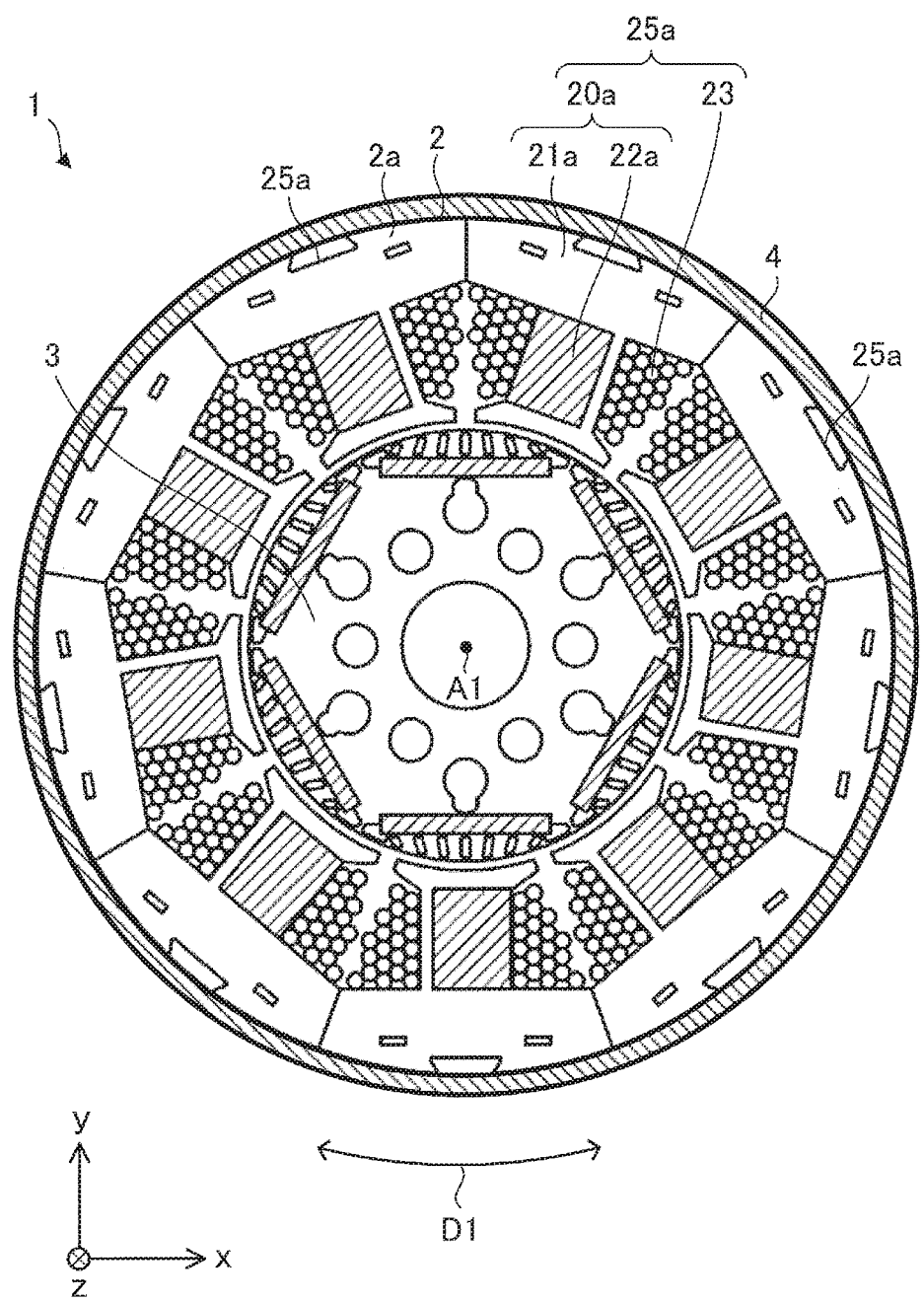
FIG. 1 is a cross-sectional view schematically showing an internal structure of a motor including a stator according to a first embodiment of the present invention.

FIG. 1 is a cross-sectional view schematically showing an internal structure of a motor 1 including a stator 2 according to a first embodiment of the present invention.

The arrow D1 indicates a direction along the outer circumference of each of the stator 2, a stator core 2a and a rotor 3 (hereinafter referred to as a "circumferential direction"). In the xyz orthogonal coordinate system shown in each drawing, a z-axis direction (z-axis) represents a direction parallel to an axis line A1 (shaft center) of a shaft (a shaft 32 which will be described later) of the motor 1 (hereinafter referred to as an "axial direction"), an x-axis direction (x-axis) represents a direction perpendicular to the z-axis direction, and a y-axis direction (y-axis) represents a direction perpendicular to both of the z-axis direction and the x-axis direction.

The motor 1 includes the stator 2 and the rotor 3. In the example shown in FIG. 1, the motor 1 further includes a frame 4 (referred to also as a housing, a shell or a motor frame). The motor 1 is a permanent magnet embedded motor, for example.

The stator 2 includes the stator core 2a formed in an annular shape and a winding 23 wound around the stator core 2a. The stator 2 is formed in an annular shape in the circumferential direction around the axis line A1 (rotation axis of the rotor 3). The rotor 3 is rotatably inserted inside the stator 2. Between an inner surface of the stator 2 and an outer surface of the rotor 3, an air gap having a thickness of 0.3 mm to 1 mm is formed. When electric current is supplied from an inverter to the winding 23 of the stator 2, the rotor 3 rotates. The current supplied to the winding 23 is current having a frequency in sync with commanded rotational frequency.

The stator 2 (specifically, the stator core 2a) is supported by the frame 4. For example, the stator 2 (specifically, the stator core 2a) is fixed to the frame 4 by means of shrink fitting or press fitting. In the example shown in FIG. 1, a first core part 21a of the stator core 2a is in contact with the frame 4, while a second core part 22a is not in contact with the frame 4.

The stator 2 includes a plurality of split core parts 25a. In the example shown in FIG. 1, the plurality of split core parts 25a are arranged annularly in the circumferential direction around the axis line A1, by which the stator 2 is formed.

Figure 2:
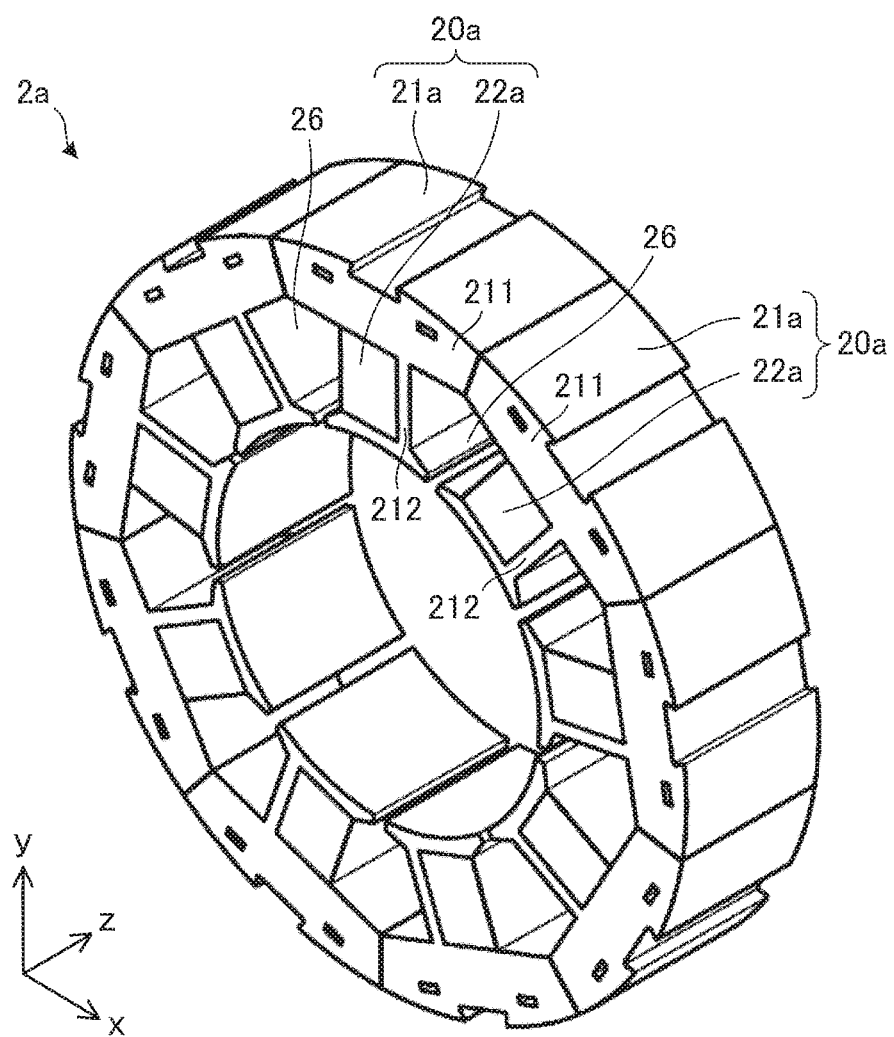
FIG. 2 is a perspective view schematically showing a structure of a stator core.

FIG. 2 is a perspective view schematically showing a structure of the stator core 2a.

The stator core 2a includes at least one first core part 21a and at least one second core part 22a. The stator core 2a is formed of a plurality of separated stator cores 20a (hereinafter referred to also as "split stator cores 20a"). Thus, each split stator core 20a includes the first core part 21a (split first core part 21a) and the second core part 22a (split second core part 22a).

However, the stator 2 does not necessarily have to be formed of the plurality of split stator cores 20a. For example, the stator core 2a may be formed by stacking a plurality of annular materials (e.g., electromagnetic steel sheets, amorphous metal sheets, or the like).

As shown in FIG. 2, in the stator core 2a, a yoke part 211 of a split stator core 20a is connected to the yoke part 211 of an adjacent split stator core 20a. A region surrounded by two yoke parts 211 and two tooth parts (each formed by a tooth part 212 of the first core part 21a and the second core part 22a) of the stator core 2a is a slot part 26.

A plurality of slot parts 26 are formed at even intervals in the circumferential direction. In the example shown in FIG. 2, nine slot parts 26 are formed in the stator core 2a.

As shown in FIG. 2, the stator core 2a includes a plurality of tooth parts (each formed by the tooth part 212 of the first core part 21a and the second core part 22a), and the tooth parts adjoin each other via the slot part 26. Thus, the plurality of tooth parts and the plurality of slot parts 26 are arranged alternately in the circumferential direction. The arrangement pitch of the plurality of tooth parts in the circumferential direction (accordingly, the width of the slot part 26 in the circumferential direction) is uniform.

Figure 3:
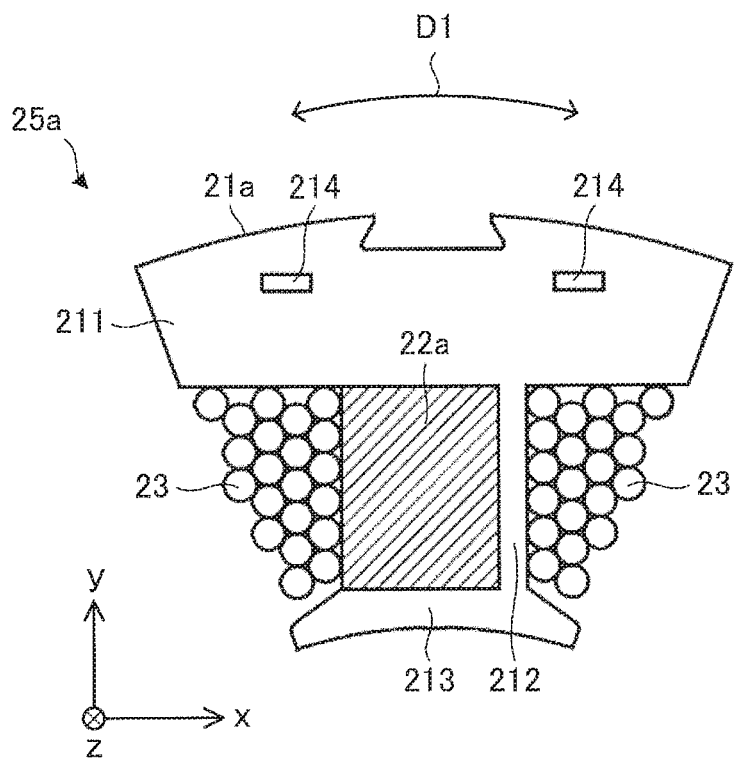
FIG. 3 is a cross-sectional view schematically showing a structure of a split core part.

FIG. 3 is a cross-sectional view schematically showing a structure of the split core part 25a.

Each split core part 25a includes the first core part 21a (split first core part 21a), the second core part 22a (split second core part 22a), and the winding 23.

The winding 23 is wound around the stator core 2a and forms a coil for generating a rotating magnetic field. Specifically, the winding 23 is wound around an outer periphery of the tooth part 212 of the first core part 21a and the second core part 22a. The winding 23 is desired to be wound so as to press the second core part 22a against the first core part 21a (e.g., the tooth part 212). Further, an insulator electrically insulating the stator core 2a is desired to be arranged between the stator core 2a and the winding 23.

The winding 23 is magnet wire, for example. For example, the stator 2 is a three-phase stator and the connection of the winding 23 (coil) is Y connection (star connection). The number of turns and the wire diameter of the winding 23 (coil) are determined according to the rotational frequency, torque, and voltage specifications of the motor 1, the cross-sectional area of the slot part 26, and so forth. The wire diameter of the winding 23 is 1.0 mm, for example. Around each tooth part 212 of the stator core 2a, the winding 23 is wound for 80 turns, for example. However, the wire diameter and the number of turns of the winding 23 are not limited to these examples.

The method of winding the winding 23 (coil) is concentrated winding. For example, the winding 23 can be wound around the split stator cores 20a in a state before the split stator cores 20a are arranged annularly (e.g., in a state in which the split stator cores 20a are arranged in a straight line). The split stator cores 20a wound with the winding 23 (i.e., the split core parts 25a) are folded annularly and fixed by means of welding or the like.

However, the method of winding the winding 23 (coil) is not limited to concentrated winding. For example, the present invention is applicable also to a stator including a toroidal coil as a coil formed in the circumferential direction (e.g., a coil formed in an annular shape). In this case, the second core part 22a is provided on a side face of the first core part 21a in a radial direction, for example.

The first core part 21a includes the yoke part 211 and the tooth part 212. The yoke part 211 extends in the circumferential direction, while the tooth part 212 extends inward (−y direction in FIG. 3) in the radial direction of the stator core 2a. In other words, the tooth part 212 projects from the yoke part 211 towards the axis line A1. The first core part 21a further includes a tooth end part 213 formed at a tip end of the first core part 21a in the radial direction. In the example shown in FIG. 3, the tooth part 212 has a uniform width while extending in the radial direction. The tooth end part 213, extending in the circumferential direction, is formed to spread in the circumferential direction.

Figure 4:
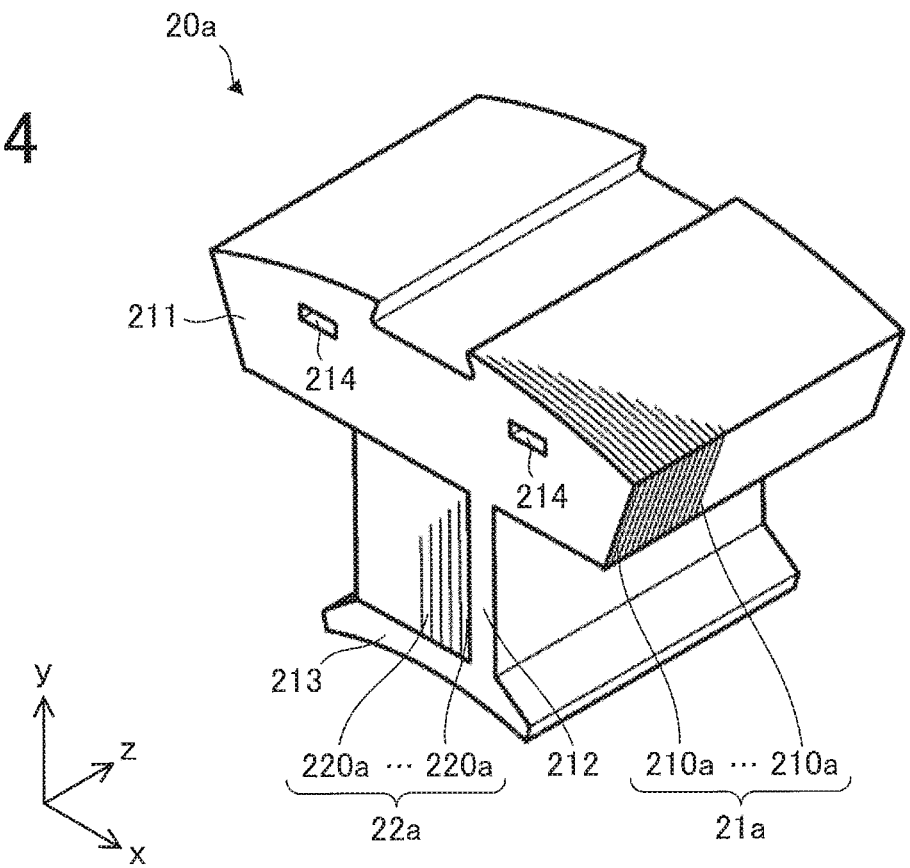
FIG. 4 is a perspective view schematically showing a structure of a split stator core.

FIG. 4 is a perspective view schematically showing a structure of the split stator core 20a.

The first core part 21a is formed by at least one first sheet 210a (referred to also as a first plate). In this embodiment, the first core part 21a includes a plurality of first sheets 210a stacked in a first direction. In other words, the plurality of first sheets 210a are stacked in parallel with a plane perpendicular to the first direction. In the example shown in FIG. 4, the first direction is the z-axis direction.

The first sheet 210a has been formed in a predetermined shape by a punch out process (press punch out processing). The first sheet 210a is an electromagnetic steel sheet, for example. The electromagnetic steel sheet used as the first sheet 210a is, for example, a non-oriented electromagnetic steel sheet having average magnetic properties in all directions. The thickness of the first sheet 210a is 0.1 mm to 0.7 mm, for example. In this embodiment, the thickness of the first sheet 210a is 0.35 mm. However, the shape and the thickness of the first sheet 210a are not limited to this embodiment. Each first sheet 210a is fastened to adjacent first sheets 210a by means of caulking 214.

The second core part 22a is formed by at least one second sheet 220a (referred to also as a second plate). In this embodiment, the second core part 22a includes a plurality of second sheets 220a stacked in a second direction perpendicular to the first direction. In this embodiment, the second core part 22a is a rectangular prism. The second core part 22a is provided on a side face of the first core part 21a. In other words, the second core part 22a is arranged in a hollow formed between the yoke part 211 and the tooth end part 213. Accordingly, the split stator core 20a is formed in a T-shape. It is also possible to provide the second core part 22a on a side face of the first core part 21a in the radial direction.

In this embodiment, the second core part 22a adjoins the first core part 21a in the circumferential direction. Specifically, the second core part 22a adjoins the tooth part 212 (e.g., outer surface of the tooth part 212 in the circumferential direction) in the circumferential direction. Accordingly, the tooth part 212 of the first core part 21a and the second core part 22a form the tooth part of the stator core 2a (split stator core 20a) around which the winding 23 is wound. In the example shown in FIG. 4, the second direction is the x-axis direction. However, the second direction is not limited to the x-axis direction.

The second sheet 220a is a sheet formed of amorphous metal or nanocrystal alloy, for example. The nanocrystal alloy is magnetic material having nanocrystal grain structure (a grain diameter of 100 nm or less).

For example, while the electromagnetic steel sheet of approximately 0.1 mm to 0.7 mm in thickness is used for the stator core, amorphous metal and nanocrystal alloy can be formed so as to have a thickness of approximately 15 μm to 30 μm. When amorphous metal or nanocrystal alloy is used as the material of the stator core 2a, iron loss density in the stator core 2a can be reduced. For example, the iron loss density of a non-oriented electromagnetic steel sheet 0.35 mm thick is 0.93 W/kg (magnetic flux density 1.0 T at 50 Hz), while the iron loss density of amorphous metal 25 μm thick is 0.17 W/kg (magnetic flux density 1.0 T at 50 Hz). Thus, the iron loss density of amorphous metal is extremely low in comparison with the non-oriented electromagnetic steel sheet.

However, the non-oriented electromagnetic steel sheet is superior to amorphous metal in terms of magnetic permeability. For example, the saturation magnetic flux density of the non-oriented electromagnetic steel sheet 0.35 mm thick is 2.03 T, while the saturation magnetic flux density of the amorphous metal 25 μm thick is 1.56 T.

In this embodiment, the second sheet 220a is in a rectangular shape. The thickness of the second sheet 220a is 5 μm to 50 μm, for example. The second sheet 220a is thinner than the first sheet 210a. In this embodiment, the thickness of the second sheet 220a is 25 μm. Accordingly, the iron loss in the stator core 2a (specifically, the second core part 22a) can be reduced. However, the shape and the thickness of the second sheet 220a are not limited to this embodiment. Each second sheet 220a is fixed to adjacent second sheets 220a by means of molding with a mold, an adhesive agent, or welding.

In general, amorphous metal has hardness (e.g., Vickers hardness) three to six times that of the non-oriented electromagnetic steel sheet, and thus workability of amorphous metal is low. For example, the Vickers hardness of the non-oriented electromagnetic steel sheet is approximately 200 GN/m$^3$, while the Vickers hardness of amorphous metal is approximately 900 GN/m$^3$. Further, magnetic properties of amorphous metal are remarkably deteriorated by compressive stress. Thus, in the case where the motor is used for a compressor, for example, it is desirable to employ structure capable of lightening the compressive stress caused by a hermetic container of the compressor.

Since amorphous metal has hardness (e.g., Vickers hardness) three to six times that of a standard electromagnetic steel sheet as mentioned above, it is difficult to process amorphous metal into a complicated shape by the punch out process. Further, since the amorphous metal used as the second sheet 220a is thin, a lot of second sheets 220a are necessary to form the second core part 22a. For that reason, in the case where the punch out process is used, steps for processing and steps for adhering the second sheets 220a increase and that leads to a drop in productivity and early deterioration of tools such as edged tools. Therefore, it is possible to form the second core part 22a with ease by, for example, cutting amorphous metal into rectangular sheets by means of shearing and stacking the rectangular sheets into a roll shape or a block shape.

Figure 5:
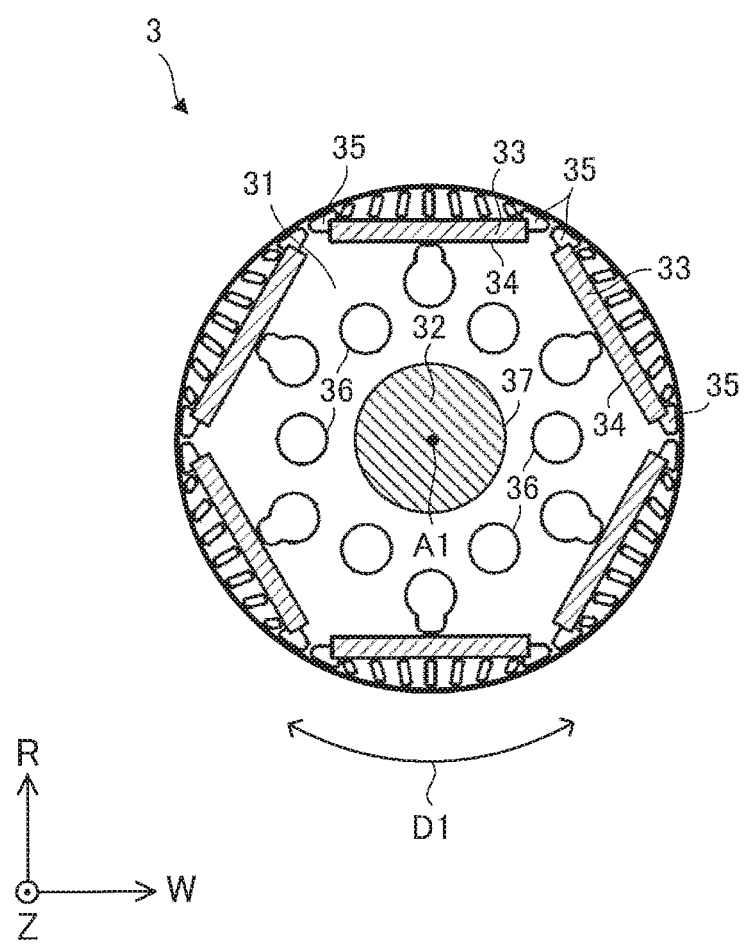
FIG. 5 is a cross-sectional view schematically showing a structure of a rotor.

The structure of the rotor 3 will be described below. FIG. 5 is a cross-sectional view schematically showing the structure of the rotor 3.

The rotor 3 includes a rotor core 31 and a shaft 32. The rotor 3 is rotatable around the axis line A1. The rotor 3 is rotatably arranged inside the stator 2 via the air gap. The axis line A1 is the rotation center of the rotor 3 and the axis line of the shaft 32.

In this embodiment, the rotor 3 is of the permanent magnet embedded type. In the rotor core 31, a plurality of magnet insertion holes 34 are formed in the circumferential direction of the rotor 3. The magnet insertion hole 34 is a void into which a permanent magnet 33 is inserted. In each magnet insertion hole 34, a plurality of permanent magnets 33 are arranged. However, it is also possible to arrange one permanent magnet 33 in each magnet insertion hole 34. Each permanent magnet 33 has been magnetized to have magnetization in the radial direction of the rotor 3. The number of the magnet insertion holes 34 corresponds to the number of magnetic poles of the rotor 3. The magnetic poles are equivalent to each other in the positional relationship. In this embodiment, the number of magnetic poles of the rotor 3 is six. However, it is permissible if the number of magnetic poles of the rotor 3 is two or more.

Used as the permanent magnet 33 is, for example, a rare-earth magnet containing neodymium (Nd), iron (Fe) and boron (B) as the principal components.

The rotor core 31 is formed by stacking a plurality of electromagnetic steel sheets. The thickness of each electromagnetic steel sheet of the rotor core 31 is 0.1 mm to 0.7 mm. In this embodiment, the thickness of each electromagnetic steel sheet of the rotor core 31 is 0.35 mm. Each electromagnetic steel sheet of the rotor core 31 is desired to be a non-oriented electromagnetic steel sheet having average magnetic properties in all directions. However, the material, shape and thickness of each electromagnetic steel sheet of the rotor core 31 are not limited to this embodiment. Each electromagnetic steel sheet of the rotor core 31 is fastened to adjacent electromagnetic steel sheets by means of caulking.

The shaft 32 is connected to the rotor core 31. For example, the shaft 32 is fixed to a shaft hole 37 formed in the rotor core 31 by means of shrink fitting, press fitting or the like. Accordingly, rotational energy generated by the rotation of the rotor core 31 is transmitted to the shaft 32.

Each flux barrier 35 is formed at a position adjoining the magnet insertion hole 34 in the circumferential direction of the rotor 3. The flux barrier 35 reduces leakage flux. To prevent a short circuit of magnetic flux between adjacent magnetic poles, the distance between the flux barrier 35 and the outer surface (outer edge) of the rotor 3 is desired to be short. The distance between the flux barrier 35 and the outer surface of the rotor 3 is 0.35 mm, for example. Air holes 36 are through holes. For example, in the case where the motor 1 is used for a compressor, the refrigerant can flow through the air holes 36.

Figure 6:
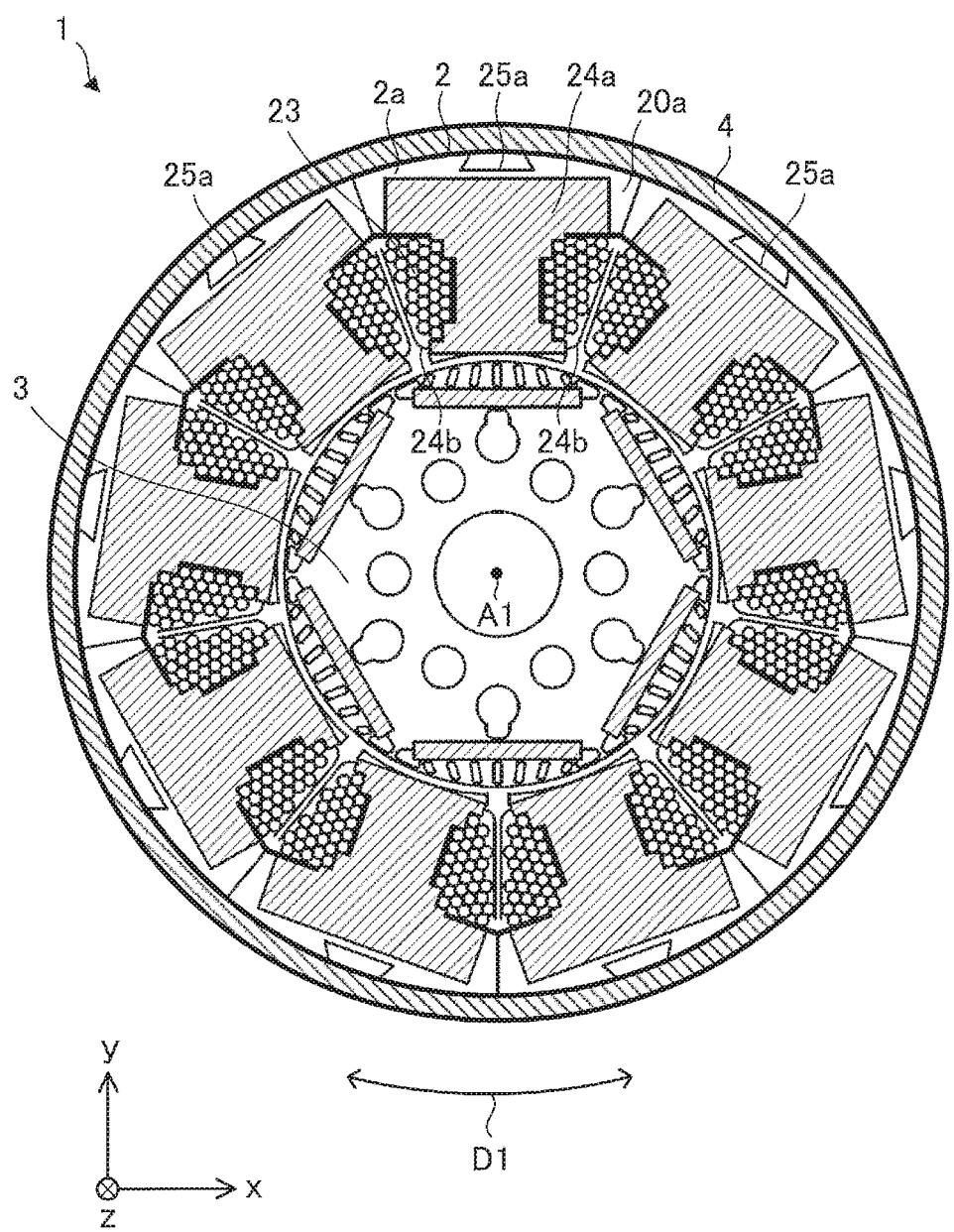
FIG. 6 is a cross-sectional view schematically showing another example of the motor.

FIG. 6 is a cross-sectional view schematically showing another example of the motor 1.

In the motor 1, the split core part 25a may include an insulator electrically insulating the split stator core 20a. In the example shown in FIG. 6, the split core part 25a includes the split stator core 20a, the winding 23, a first insulator 24a and a second insulator 24b.

The first insulator 24a is combined with the split stator core 20a. The first insulator 24a is provided at each end part of the split stator core 20a in the axial direction. However, it is also possible to provide the first insulator 24a at only one end part of the split stator core 20a in the axial direction. The first insulator 24a is insulating resin, for example.

The second insulator 24b is a thin PET (polyethylene terephthalate) film, for example. The thickness of the PET film is 0.15 mm, for example. The second insulator 24b covers a side face of the tooth part of the split stator core 20a.

The winding 23 is wound around the split stator core 20a (outer periphery of the first core part 21a and the second core part 22a) with the first insulator 24a and the second insulator 24b in between and forms a coil for generating a rotating magnetic field.

A method of producing the stator 2 according to the first embodiment will be described below.

Figure 7:
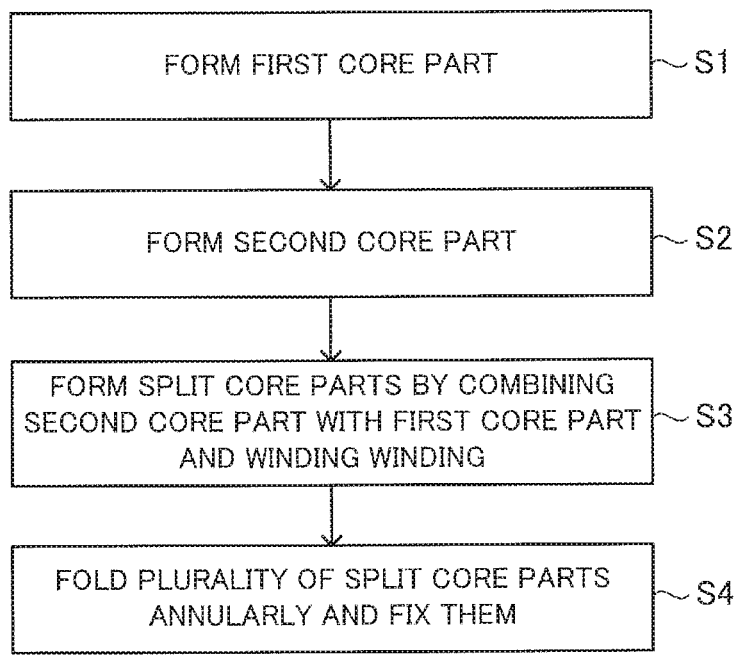
FIG. 7 is a flowchart showing an example of a process of producing the stator.

FIG. 7 is a flowchart showing an example of a process of producing the stator 2.

In step S1, a plurality of first sheets 210a each having predetermined structure are formed, and the first core part 21a is formed by stacking the plurality of first sheets 210a in the first direction. The first sheet 210a is, for example, an electromagnetic steel sheet such as a non-oriented electromagnetic steel sheet. For example, the first sheet 210a is formed to have the predetermined structure by the punch out process (press punch out processing). The plurality of first sheets 210a are stacked in the first direction while being fastened by means of the caulking 214, for example.

In step S2, a plurality of second sheets 220a each having predetermined structure are formed, and the second core part 22a is formed by stacking the plurality of second sheets 220a in the second direction perpendicular to the first direction. The second sheet 220a is formed of amorphous metal or nanocrystal alloy, for example. For example, amorphous material or nanocrystal material is cut into a predetermined shape by means of shearing. In this embodiment, the second sheet 220a is in a rectangular shape. For example, the plurality of second sheets 220a are fixed by means of molding with a mold, an adhesive agent, or welding, and thus the plurality of second sheets 220a can be stacked in the second direction.

In step S3, a plurality of split core parts 25a are formed. First, the split stator core 20a is formed by combining the second core part 22a with the first core part 21a. Further, the winding 23 is wound around the split stator core 20a, by which the second core part 22a is fixed to a side face of the first core part 21a. One split core part 25a can be formed by this process. For example, the winding 23 can be wound by the flyer winding method by using a coil winding machine. The plurality of split core parts 25a are formed by repeatedly executing the process of the step S3.

When the winding 23 is wound, it is desirable to wind the winding 23 so as to press the second core part 22a against the first core part 21a. This makes it possible to reduce a gap between the first core part 21a and the second core part 22a.

In the case where an insulator such as the first insulator 24a or the second insulator 24b is used as shown in FIG. 6, the insulator is combined with the split stator core 20a before winding the winding 23. Further, the winding 23 is wound around the split stator core 20a to which the insulator has been attached.

In step S4, the plurality of split core parts 25a are folded annularly and fixed by means of welding or the like.

By the steps described above, the stator 2 can be produced. The above-described method of producing the stator 2 may be applied to the production of stators according to other embodiments which will be described later.

Advantages of the stator 2 according to the first embodiment will be described below.

In general, the magnetic flux flowing in the stator core passes through the tooth part and splits in the yoke part, and thus the magnetic flux density rises in the tooth part and the iron loss increases in many cases. Therefore, the tooth part is desired to be formed of material having excellent magnetic properties (material with low iron loss density) such as thin sheets formed of amorphous metal, nanocrystal alloy or the like, for example.

In the stator 2 according to the first embodiment, the second core part 22a is provided on a side face of the first core part 21a. In this embodiment, the second core part 22a adjoins the tooth part 212 in the circumferential direction.

Accordingly, the tooth part 212 of the first core part 21a and the second core part 22a form the tooth part of the stator core 2a (split stator core 20a) around which the winding 23 is wound.

As described above, the stator 2 according to the first embodiment has structure suitable for the use of amorphous metal or nanocrystal alloy for the stator core 2a. Therefore, material having high magnetic permeability such as electromagnetic steel sheets can be used for the first core part 21a, material having excellent magnetic properties (material with low iron loss density) such as amorphous metal or nanocrystal alloy can be used for the second core part 22a, and the iron loss can be reduced while inhibiting the drop in the magnetic permeability in the stator core 2a (specifically, the tooth part). Accordingly, deterioration in the magnetic properties of the stator 2 can be prevented. The motor 1 with high efficiency can be obtained by using the stator 2 for the motor 1.

Further, also when high-cost material is used as the material for the second core part 22a, the second core part 22a is arranged in a part where the iron loss is likely to occur, namely, the tooth part of the stator core 2a (part formed by the tooth part 212 of the first core part 21a and the second core part 22a) and low-cost material such as electromagnetic steel sheets can be used for other parts. Accordingly, the cost for the stator 2 can be reduced.

In the case where a gap has been formed between the first core part 21a and the second core part 22a, the gap serves as magnetic resistance and obstructs the passage of magnetic flux. This gap can cause the local magnetic flux concentration or the drop in the flux linkage of the winding 23 in the stator core 2a. For example, when the local magnetic flux concentration occurs in the stator core 2a, the iron loss increases in the part where the magnetic flux concentration has occurred. For example, when the flux linkage of the winding 23 drops in the stator core 2a, electric current supplied to the winding 23 so as to maintain the torque of the motor 1 increases and the copper loss increases. Especially when the first core part 21a and the second core part 22a are formed of materials having magnetic properties different from each other (materials having magnetic permeabilities different from each other), the gap enhances the difference in the magnetic permeability and the local magnetic flux concentration is likely to occur. Therefore, excellent magnetic properties cannot be obtained when a gap has been formed between the first core part 21a and the second core part 22a.

In the stator 2 according to the first embodiment, the winding 23 is wound around the outer periphery of the first core part 21a and the second core part 22a forming the tooth part of the stator core 2a. Accordingly, the second core part 22a is pressed against the first core part 21a by the winding 23, by which the gap between the first core part 21a and the second core part 22a can be reduced. Accordingly, the local magnetic flux concentration or the drop in the flux linkage of the winding 23 caused by the occurrence of the gap can be prevented and the stator 2 and the motor 1 with excellent magnetic properties (motor 1 with high efficiency) can be obtained.

In the case where the winding 23 is wound around the stator core 2a by concentrated winding, the second core part 22a can be strongly pressed against the first core part 21a, by which the gap between the first core part 21a and the second core part 22a can be reduced further. Further, in the case where the stator 2 is formed of a plurality of split core parts 25a, the winding 23 can be wound around the stator core 2a by the flyer winding method by using a coil winding machine. Accordingly, the winding 23 can be tightly wound around the stator core 2a and the gap between the first core part 21a and the second core part 22a can be reduced further in comparison with stators made with a stator core formed in an annular shape (stator core not split).

Furthermore, in the stator 2 according to the first embodiment, the second sheets 220a are stacked in the second direction perpendicular to the first direction. In this embodiment, the tooth part 212 of the first core part 21a projects in a direction perpendicular to the axial direction and the second sheets 220a adjoin the tooth part 212 in the circumferential direction. Accordingly, a surface of the second sheets 220a having a large area can be placed in close contact with the first core part 21a and the gap between the first core part 21a and the second core part 22a can be reduced. Accordingly, the local magnetic flux concentration or the drop in the flux linkage of the winding 23 caused by the occurrence of the gap can be prevented and the stator 2 and the motor 1 with excellent magnetic properties (motor 1 with high efficiency) can be obtained.

Amorphous metal has lower iron loss density than the electromagnetic steel sheet (e.g., non-oriented electromagnetic steel sheet), while the electromagnetic steel sheet has higher magnetic permeability than amorphous metal and nanocrystal alloy. Thus, in the case where the electromagnetic steel sheet (e.g., non-oriented electromagnetic steel sheet) is used as the first sheet 210a and amorphous metal or nanocrystal alloy is used as the second sheet 220a, the iron loss can be reduced while inhibiting the drop in the magnetic permeability in the part where the iron loss is likely to occur, namely, the tooth part of the stator core 2a (the part formed by the tooth part 212 of the first core part 21a and the second core part 22a). Consequently, the motor 1 with high efficiency can be obtained by using the stator 2 for the motor 1.

The motor 1 including the stator 2 according to the first embodiment has the same advantages as those described above. Thus, the motor 1 with excellent magnetic properties (motor 1 with high efficiency) can be obtained by using the stator 2 as the stator of the motor 1.

Moreover, in this embodiment, the stator 2 (specifically, the stator core 2a) is held by the frame 4. In this case, the first core part 21a of the stator core 2a is in contact with the frame 4, while the second core part 22a is not in contact with the frame 4. Accordingly, compressive stress caused by the frame 4 can be concentrated in the first core part 21a instead of the second core part 22a. Thus, in the case where the second core part 22a is formed of material having low iron loss density (e.g., amorphous metal or nanocrystal alloy), it is possible to prevent deterioration in the magnetic properties of the second core part 22a and to make the second core part 22a sufficiently exhibit its magnetic properties. Consequently, the motor 1 with excellent magnetic properties (motor 1 with high efficiency) can be obtained.

With the method of producing the stator 2 according to the first embodiment, the stator 2 having the above-described advantages can be produced.

Further, with the method of producing the stator 2 according to the first embodiment, by winding the winding 23 around the outer periphery of the first core part 21a and the second core part 22a, the second core part 22a can be fixed to a side face of the first core part 21a so as to press the second core part 22a against the first core part 21a. Thus, the gap between the first core part 21a and the second core part 22a can be reduced. Accordingly, the local magnetic flux concentration or the drop in the flux linkage of the winding 23 caused by the occurrence of the gap can be prevented and the stator 2 with excellent magnetic properties can be produced.

Second Embodiment

Figure 8:
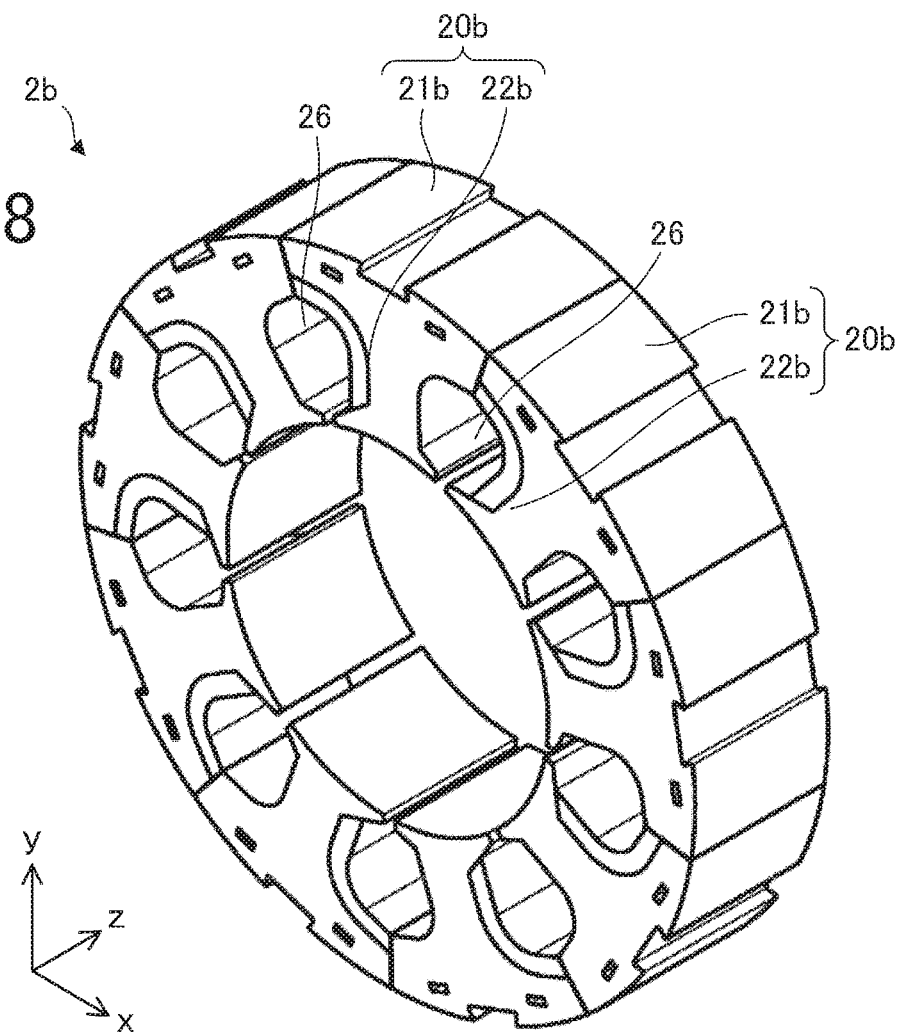
FIG. 8 is a perspective view schematically showing a structure of a stator core of a stator according to a second embodiment of the present invention.

FIG. 8 is a perspective view schematically showing a structure of a stator core 2b of a stator according to a second embodiment of the present invention.

Figure 9:
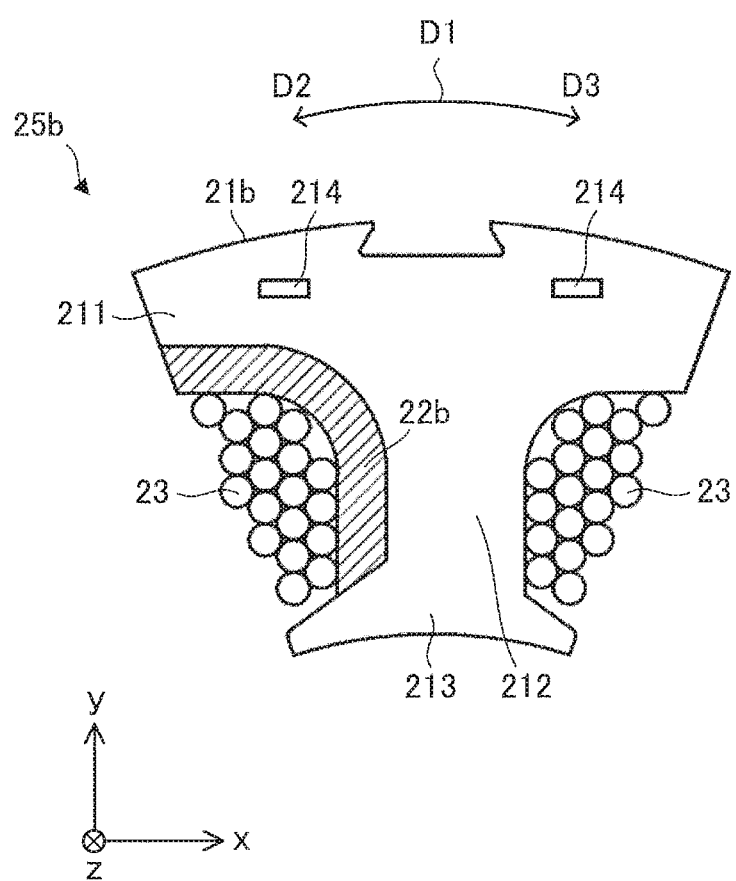
FIG. 9 is a cross-sectional view schematically showing an example of a structure of a split core part forming the stator according to the second embodiment.

FIG. 9 is a cross-sectional view schematically showing an example of a structure of a split core part 25b forming the stator according to the second embodiment. The arrow D2 indicates a rotation direction of the rotor 3 in the motor 1 (downstream side in the rotation direction), and the arrow D3 indicates the upstream side in the rotation direction of the rotor 3 in the motor 1.

Figure 10:
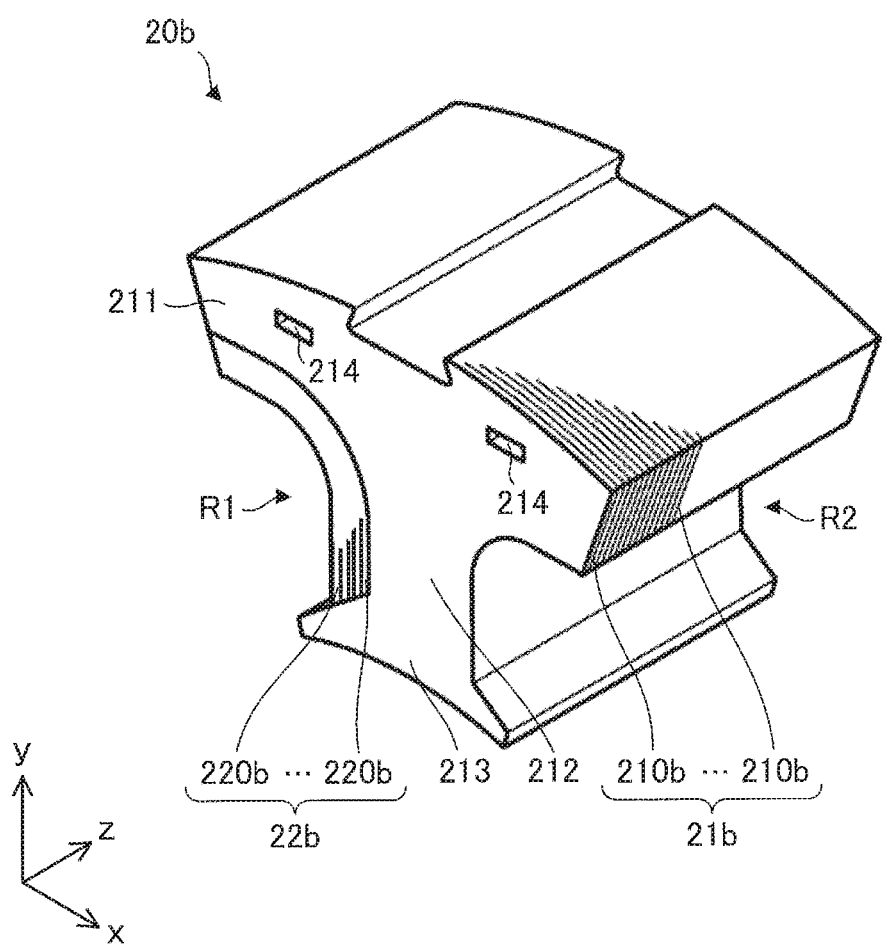
FIG. 10 is a perspective view schematically showing a structure of a split stator core of the stator according to the second embodiment.

FIG. 10 is a perspective view schematically showing a structure of a split stator core 20b.

In the second embodiment, each component identical or corresponding to a component described in the first embodiment is assigned the same reference character as in the first embodiment.

Compared with the stator 2 according to the first embodiment, the stator according to the second embodiment includes the stator core 2b instead of the stator core 2a. Specifically, the stator core 2b includes a first core part 21b instead of the first core part 21a and includes a second core part 22b instead of the second core part 22a. The other features of the stator according to the second embodiment are the same as those of the stator 2 according to the first embodiment. The stator according to the second embodiment can be applied to the motor 1 in place of the stator 2 according to the first embodiment.

The first core part 21b is formed by at least one first sheet 210b. In this embodiment, the first core part 21b includes a plurality of first sheets 210b stacked in the first direction. While the shape of the first core part 21b differs from that of the first core part 21a of the stator 2 according to the first embodiment, materials for the first core parts 21a and 21b are the same as each other. Namely, the material for the first sheet 210b is the same as that for the first sheet 210a used for the stator 2 according to the first embodiment.

The second core part 22b is formed by at least one second sheet 220b. In this embodiment, the second core part 22b includes a plurality of second sheets 220b stacked in the second direction perpendicular to the first direction. While the shape of the second core part 22b differs from that of the second core part 22a of the stator 2 according to the first embodiment, materials for the second core parts 22a and 22b are the same as each other. Namely, the material for the second sheet 220b is the same as that for the second sheet 220a used for the stator 2 according to the first embodiment.

As shown in FIG. 10, the tooth part 212 of the first core part 21b projects in a direction perpendicular to the axial direction. The stator core 2b includes a first region R1 that is a region adjoining one side face of the first core part 21b in the circumferential direction and a second region R2 that is a region adjoining the other side face of the first core part 21b in the circumferential direction. The first region R1 and the second region R2 are formed in each split stator core 20a. Thus, the stator core 2b includes a plurality of first regions R1 and a plurality of second regions R2.

In each split stator core 20b, the second core part 22b is arranged asymmetrically in the circumferential direction with respect to the tooth part 212 of the first core part 21b as the center. In the example shown in FIGS. 9 and 10, the second core part 22b is provided on one side of the tooth part 212 of the first core part 21b in the circumferential direction. In other words, in the example shown in FIGS. 9 and 10, the second core part 22b in each split stator core 20b is arranged on the downstream side of the first core part 21b in the rotation direction of the rotor 3. A boundary part between the yoke part 211 and the tooth part 212 is formed in the shape of a circular arc and the second core part 22b adjoins the boundary part.

Figure 11:
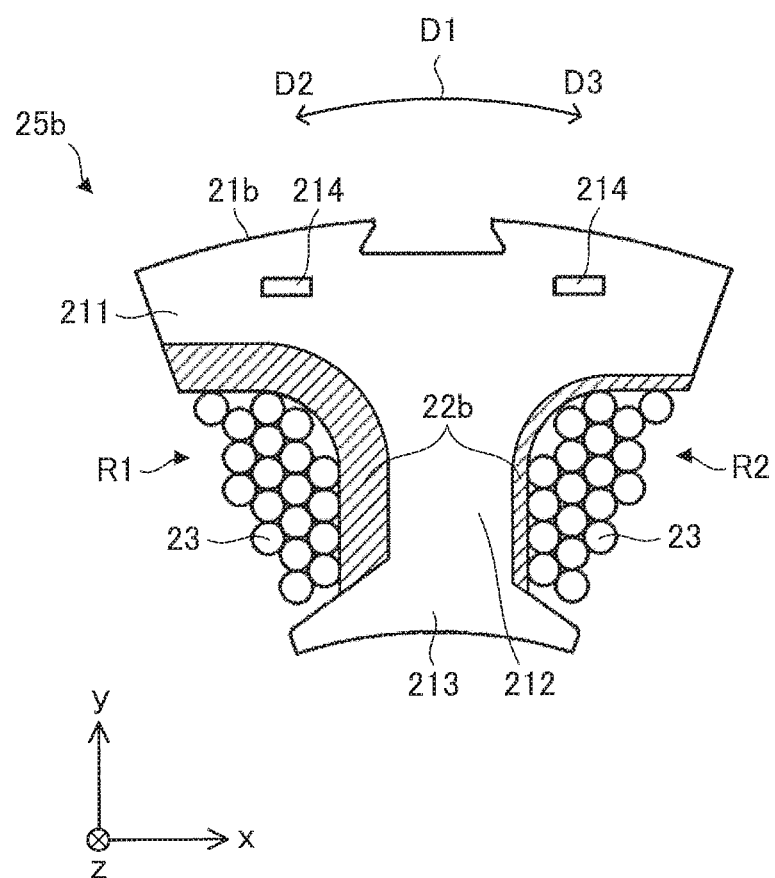
FIG. 11 is a cross-sectional view schematically showing another example of the structure of the split core part of the stator according to the second embodiment.

FIG. 11 is a cross-sectional view schematically showing another example of the structure of the split core part 25b.

In the example shown in FIG. 11, the second core part 22b is arranged in the first region R1 and the second region R2. Namely, the second core part 22b is arranged on the upstream side of the first core part 21b (in the second region R2) and on the downstream side of the first core part 21b (in the first region R1) in the rotation direction of the rotor 3. In this case, the area of the second core part 22b provided in the first region R1 in a plane perpendicular to the axial direction (xy plane) is larger than the area of the second core part 22b provided in the second region R2 in the plane perpendicular to the axial direction.

The stator according to the second embodiment has the same advantages as those of the stator 2 according to the first embodiment. Further, the stator according to the second embodiment has the following advantages.

In general, magnetic flux flowing inside each split stator core during the driving of the motor (during the rotation of the rotor) is likely to flow in the downstream side in regard to the rotation direction of the rotor. In this case, the magnetic flux flowing inside each split stator core during the driving of the motor (during the rotation of the rotor) is asymmetric in the circumferential direction.

In the stator according to the second embodiment, the second core part 22b in each split stator core 20b is arranged on the downstream side of the first core part 21b in the rotation direction of the rotor 3. In another example of the stator according to the second embodiment, the area of the second core part 22b provided in the first region R1 in the plane perpendicular to the axial direction is larger than the area of the second core part 22b provided in the second region R2 in the plane perpendicular to the axial direction.

Accordingly, in the case where the second core part 22b is formed of material with excellent magnetic properties (with low iron loss density) (e.g., amorphous metal or nanocrystal alloy), the iron loss in the part where the iron loss is likely to occur, namely, the tooth part of the stator core 2b (the part formed by the tooth part 212 of the first core part 21b and the second core part 22b) can be reduced effectively. Consequently, the motor 1 with excellent magnetic properties (motor 1 with high efficiency) can be obtained.

Further, the boundary part between the yoke part 211 and the tooth part 212 is formed in the shape of a circular arc. Therefore, the magnetic path length of magnetic flux flowing in the stator core 2b can be increased. Accordingly, the magnetic resistance in the stator core 2b can be reduced.

For example, in the case where the boundary part between the yoke part 211 and the tooth part 212 is formed in a shape of a right angle, the second core part 22b (each second sheet 220b) has to be folded at a right angle. In the state in which the second sheets 220b are folded, the magnetic properties deteriorate due to distortion of each second sheet 220b. In this embodiment, the boundary part between the yoke part 211 and the tooth part 212 is formed in the shape of a circular arc, and thus the second sheets 220b can be arranged in the boundary part between the yoke part 211 and the tooth part 212 in a slightly bent state and the deterioration of the magnetic properties in the stator core 2b can be prevented. Consequently, the motor 1 with excellent magnetic properties (motor 1 with high efficiency) can be obtained.

Third Embodiment

Figure 12:
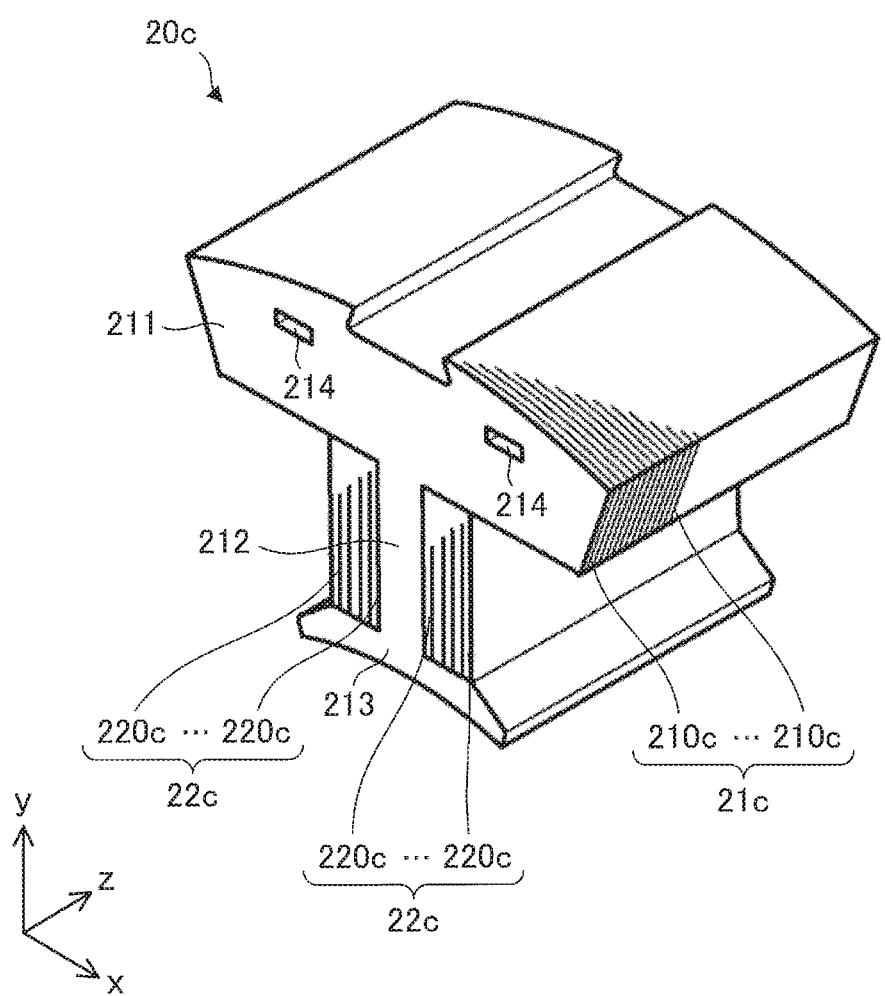
FIG. 12 is a perspective view schematically showing an example of a split stator core of a stator according to a third embodiment of the present invention.

FIG. 12 is a perspective view schematically showing an example of a split stator core 20c of a stator according to a third embodiment of the present invention.

Figure 13:
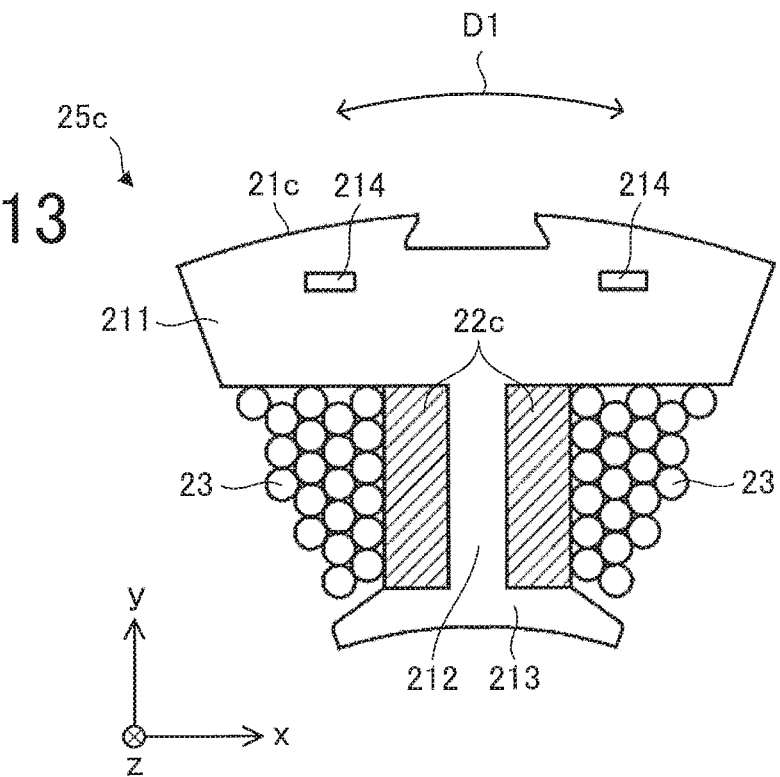
FIG. 13 is a cross-sectional view schematically showing an example of a split core part forming the stator according to the third embodiment.

FIG. 13 is a cross-sectional view schematically showing an example of a split core part 25c forming the stator according to the third embodiment.

Figure 14:
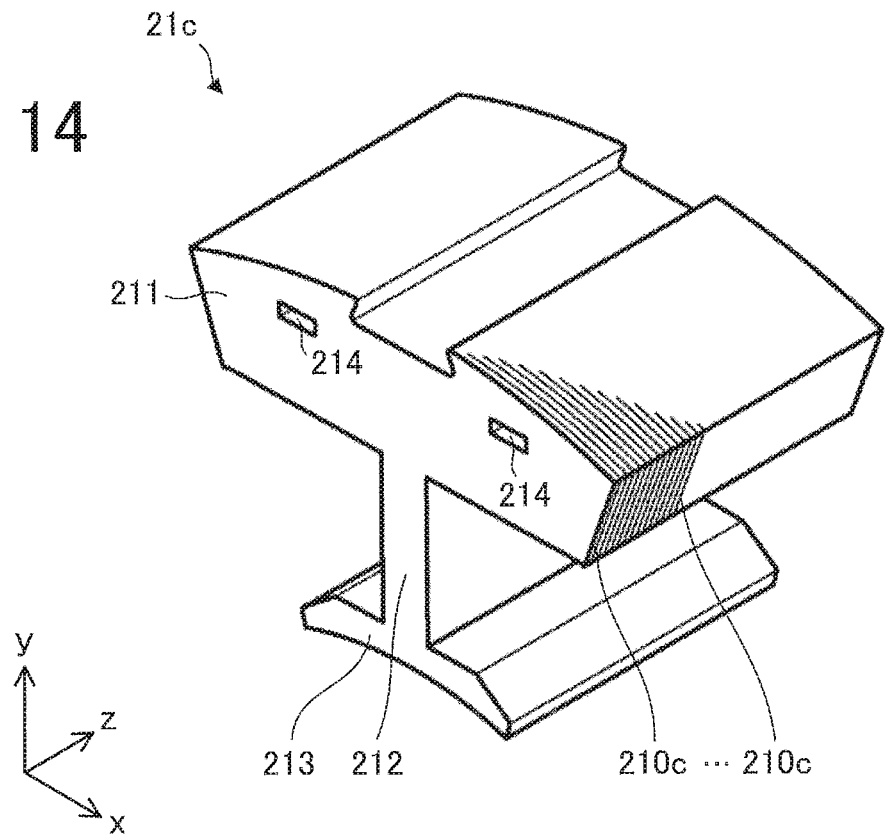
FIG. 14 is a perspective view schematically showing a structure of a first core part shown in FIG. 12.

FIG. 14 is a perspective view schematically showing a structure of a first core part 21c shown in FIG. 12.

In the third embodiment, each component identical or corresponding to a component described in the first embodiment is assigned the same reference character as in the first embodiment.

Compared with the stator 2 according to the first embodiment, the stator according to the third embodiment includes the split stator core 20c instead of the split stator core 20a. Specifically, the split stator core 20c includes the first core part 21c instead of the first core part 21a and includes a second core part 22c instead of the second core part 22a. The other features of the stator according to the third embodiment are the same as those of the stator 2 according to the first embodiment. The stator according to the third embodiment can be applied to the motor 1 in place of the stator 2 according to the first embodiment.

The first core part 21c is formed by at least one first sheet 210c. In this embodiment, the first core part 21c includes a plurality of first sheets 210c stacked in the first direction.

While the shape of the first core part 21c differs from that of the first core part 21a of the stator 2 according to the first embodiment, materials for the first core parts 21a and 21c are the same as each other. Namely, the material for the first sheet 210c is the same as that for the first sheet 210a used for the stator 2 according to the first embodiment.

The second core part 22c is formed by at least one second sheet 220c. While the shape of the second core part 22c differs from that of the second core part 22a of the stator 2 according to the first embodiment, materials for the second core parts 22a and 22c are the same as each other. Namely, the material for the second sheet 220c is the same as that for the second sheet 220a used for the stator 2 according to the first embodiment.

The second core part 22c is provided on each side of the tooth part 212 of the first core part 21c in the circumferential direction. In the example shown in FIG. 12, each split stator core 20c includes two second core parts 22c separate from each other.

Figure 15:
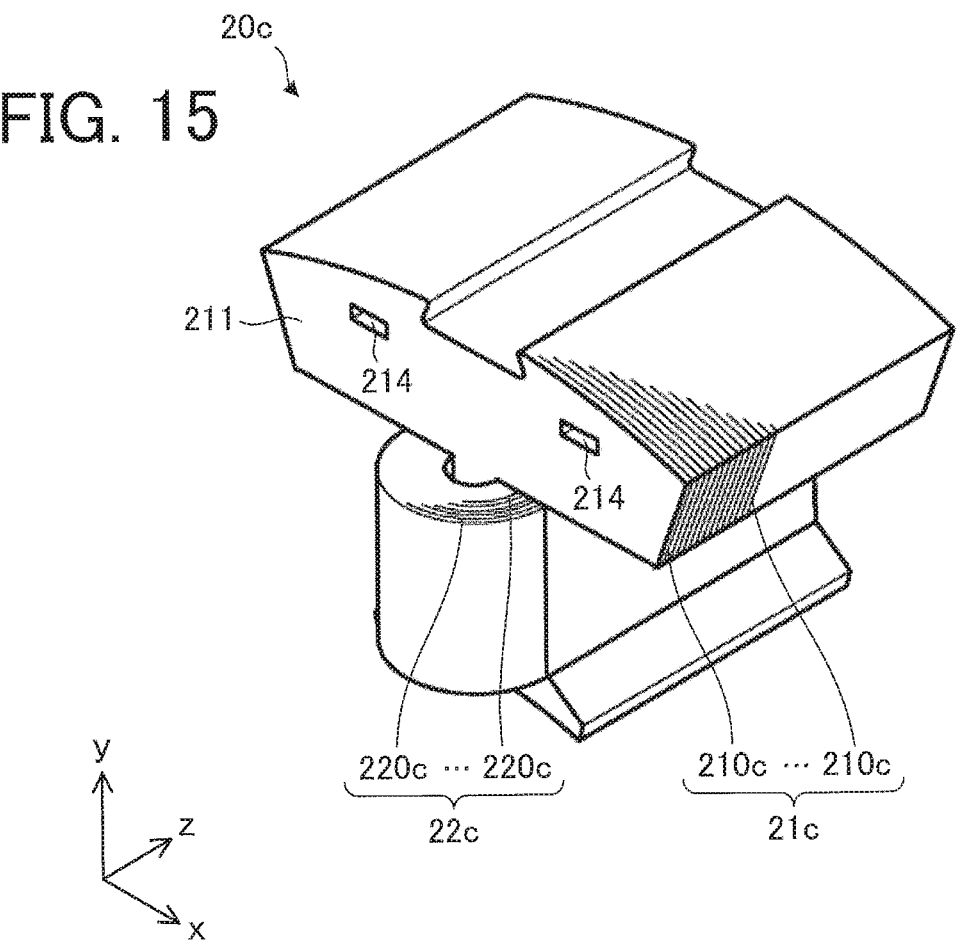
FIG. 15 is a perspective view schematically showing another example of the split stator core of the stator according to the third embodiment.

FIG. 15 is a perspective view schematically showing another example of the split stator core 20c of the stator according to the third embodiment.

Figure 16:
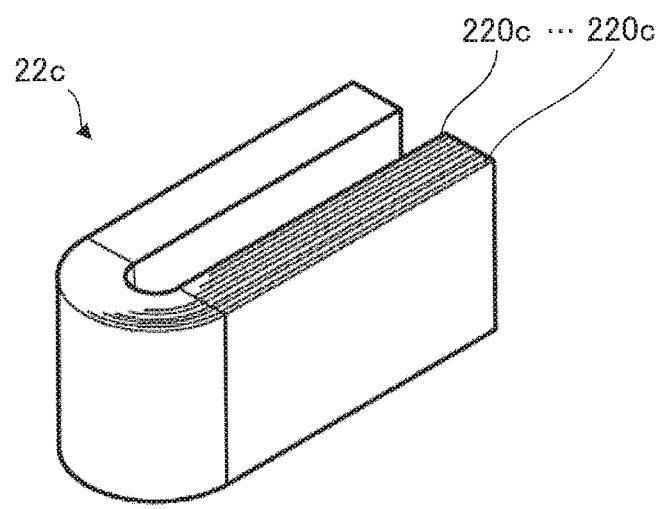
FIG. 16 is a perspective view schematically showing an example of a second core part.

FIG. 16 is a perspective view schematically showing an example of the second core part 22c.

Figure 17:
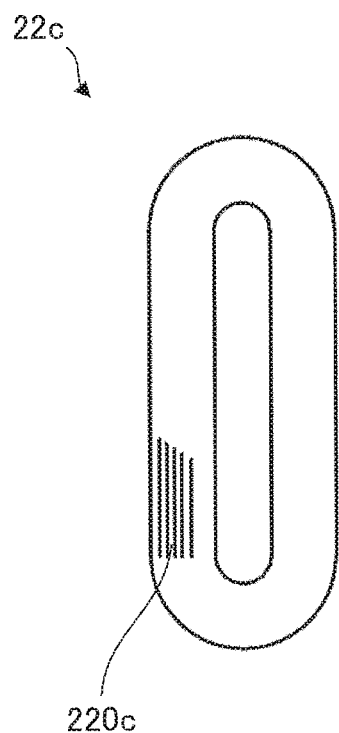
FIG. 17 is a plan view schematically showing another example of the second core part.

FIG. 17 is a plan view schematically showing another example of the second core part 22c.

In the example shown in FIG. 15, the second core part 22c is formed integrally. Namely, in the example shown in FIG. 15, the second core part 22c of the split stator core 20c is not separated. In each split stator core 20c, the second core part 22c formed integrally is provided on both sides of the tooth part 212 of the first core part 21c in the circumferential direction.

The second core part 22c shown in FIG. 15 is formed in the shape of a U-shape as shown in FIG. 16, for example. The plurality of second sheets 220c shown in FIG. 16 are stacked in the state of being bent in the shape of the U-shape. For example, the second core part 22c formed in the shape of the U-shape is inserted into the split stator core 20c from one end of the split stator core 20c in the axial direction and combined with the tooth part 212 of the first core part 21c.

The second core part 22c shown in FIG. 15 may also be formed in an annular shape as shown in FIG. 17, for example. For example, the second core part 22c can be formed annularly by winding one second sheet 220c around the tooth part 212 of the first core part 21c. The second core part 22c may be formed annularly by stacking the plurality of second sheets 220c so as to have an annular shape.

The stator according to the third embodiment has the same advantages as those of the stator 2 according to the first embodiment. Further, the stator according to the third embodiment has the following advantages.

Figure 18:
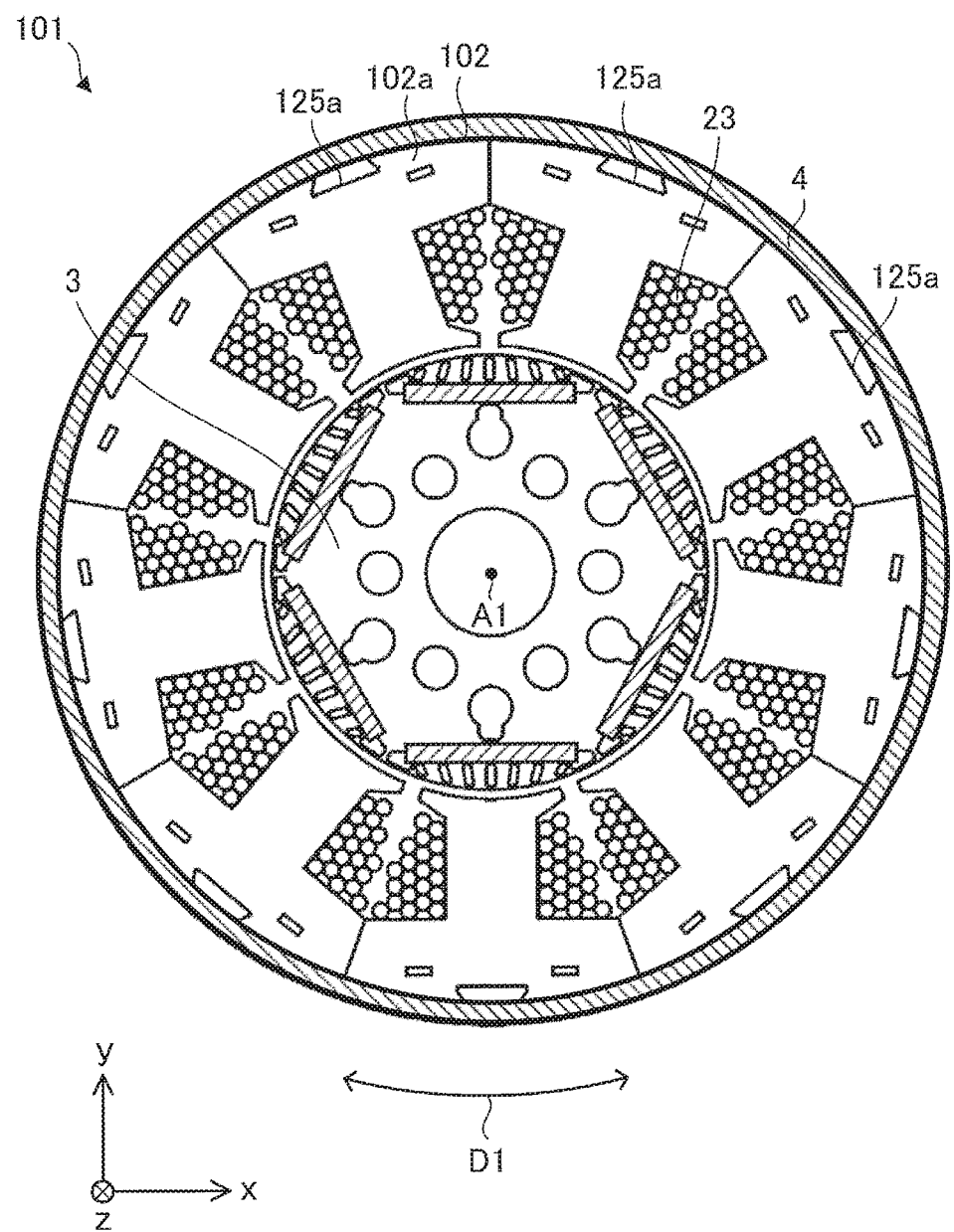
FIG. 18 is a cross-sectional view schematically showing an internal structure of a motor including a stator according to a comparative example.

FIG. 18 is a cross-sectional view schematically showing an internal structure of a motor 101 including a stator 102 according to a comparative example.

Figure 19:
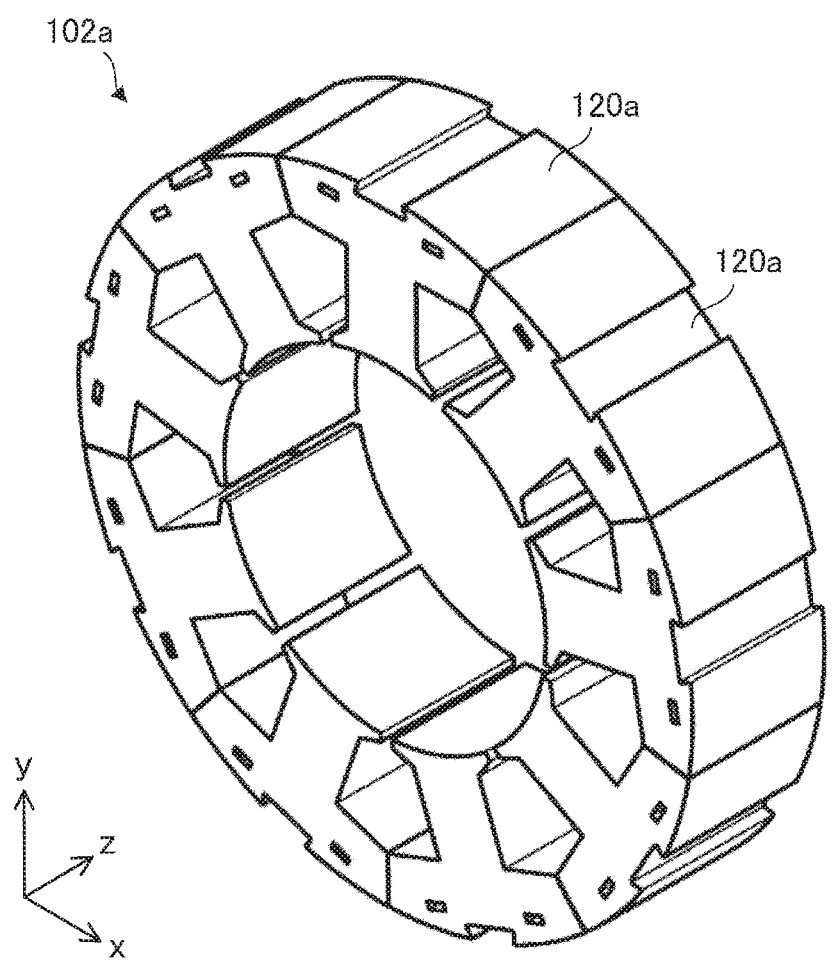
FIG. 19 is a perspective view schematically showing a structure of a stator core of the stator according to the comparative example.

FIG. 19 is a perspective view schematically showing a structure of a stator core 102a of the stator 102 according to the comparative example.

Figure 20:
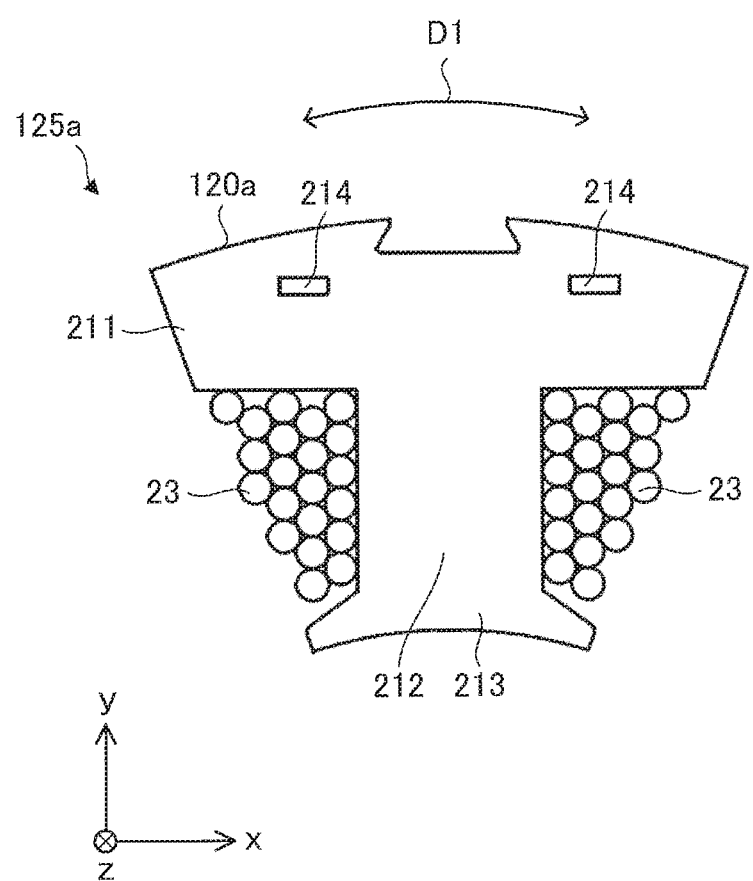
FIG. 20 is a cross-sectional view schematically showing a structure of a split core part forming the stator according to the comparative example.

FIG. 20 is a cross-sectional view schematically showing a structure of a split core part 125a forming the stator 102 according to the comparative example.

Figure 21:
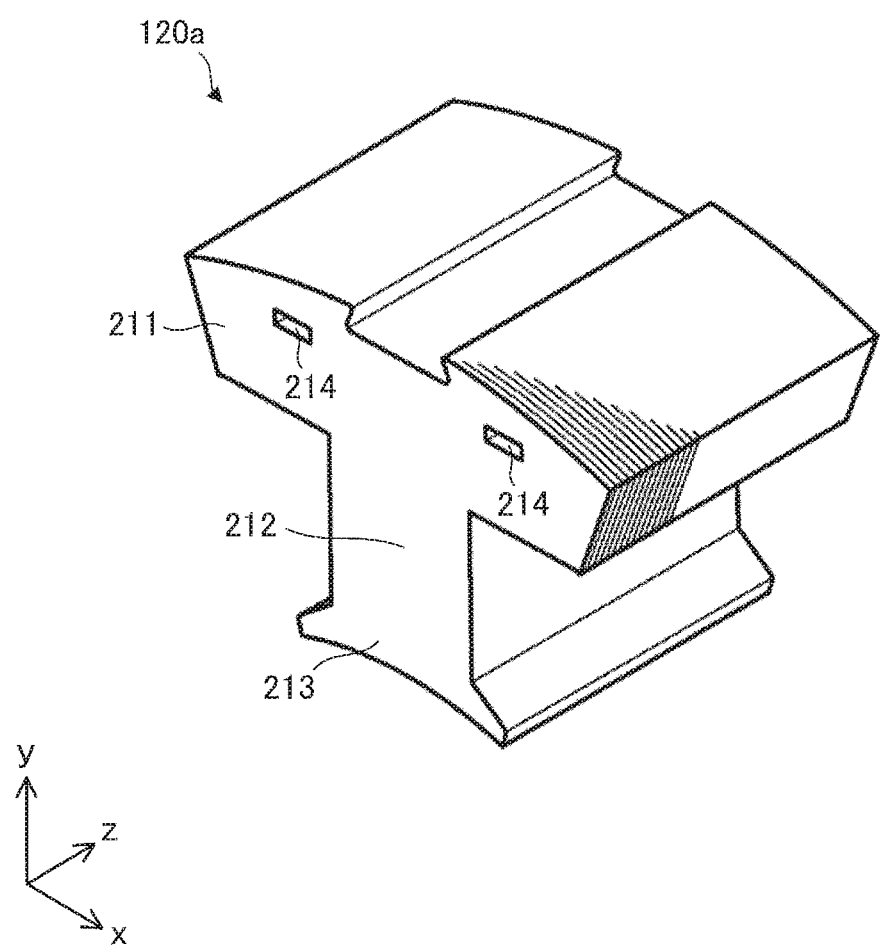
FIG. 21 is a perspective view schematically showing a structure of a split stator core of the split core part shown in FIG. 20.

FIG. 21 is a perspective view schematically showing a structure of a split stator core 120a of the split core part 125a shown in FIG. 20.

The stator 102 according to the comparative example includes the stator core 102a instead of a stator core 2c. The stator core 102a is formed by stacking a plurality of non-oriented electromagnetic steel sheets in the axial direction. Thus, the tooth part 212 of the stator core 102a is formed exclusively of non-oriented electromagnetic steel sheets. The other features of the stator 102 according to the comparative example are the same as those of the stator according to the third embodiment.

Figure 22:
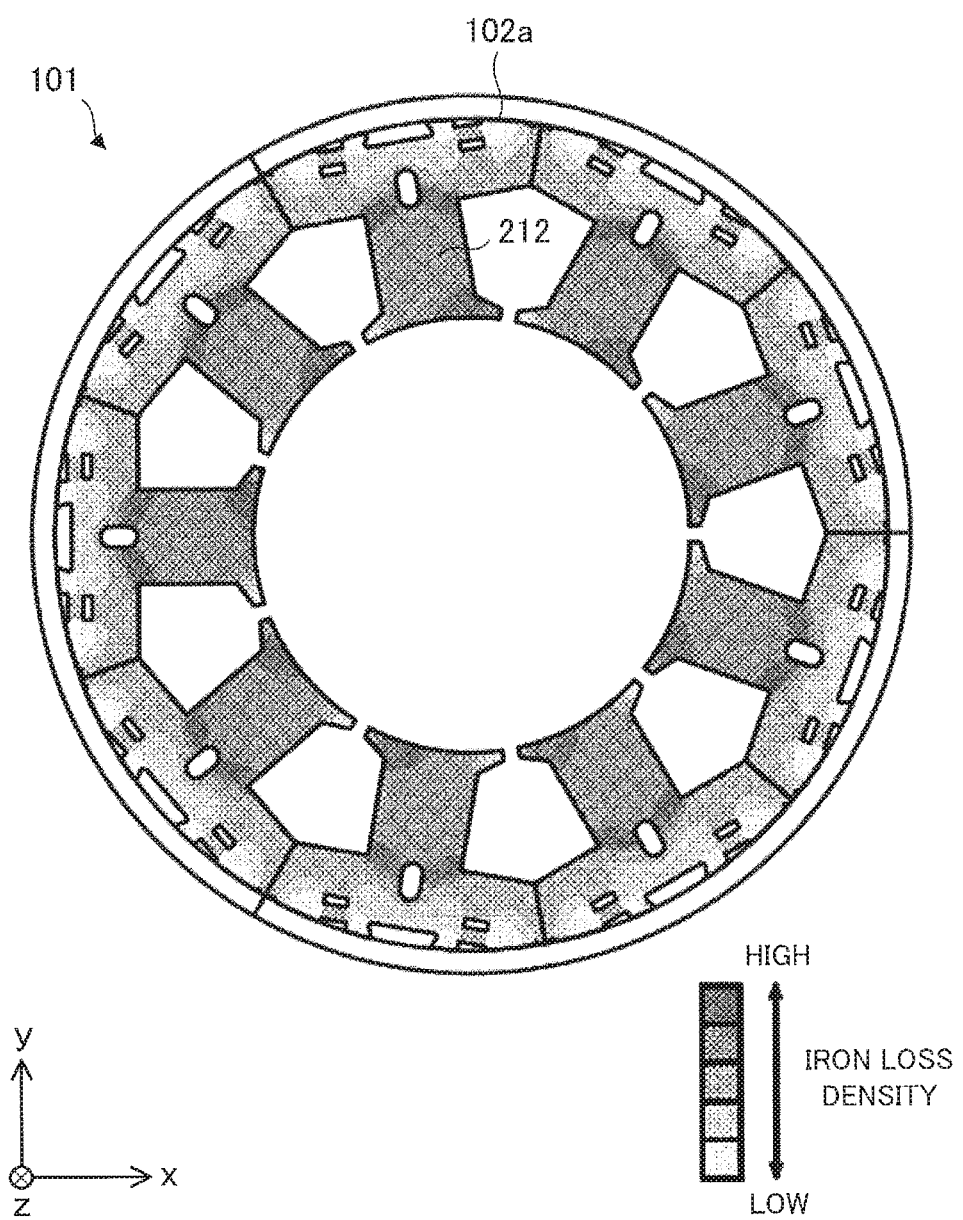
FIG. 22 is a diagram showing iron loss density in the stator core during driving of the motor including the stator according to the comparative example.

FIG. 22 is a diagram showing the iron loss density in the stator core 102a during the driving of the motor 101 including the stator 102 according to the comparative example (during the rotation of the rotor).

Figure 23:
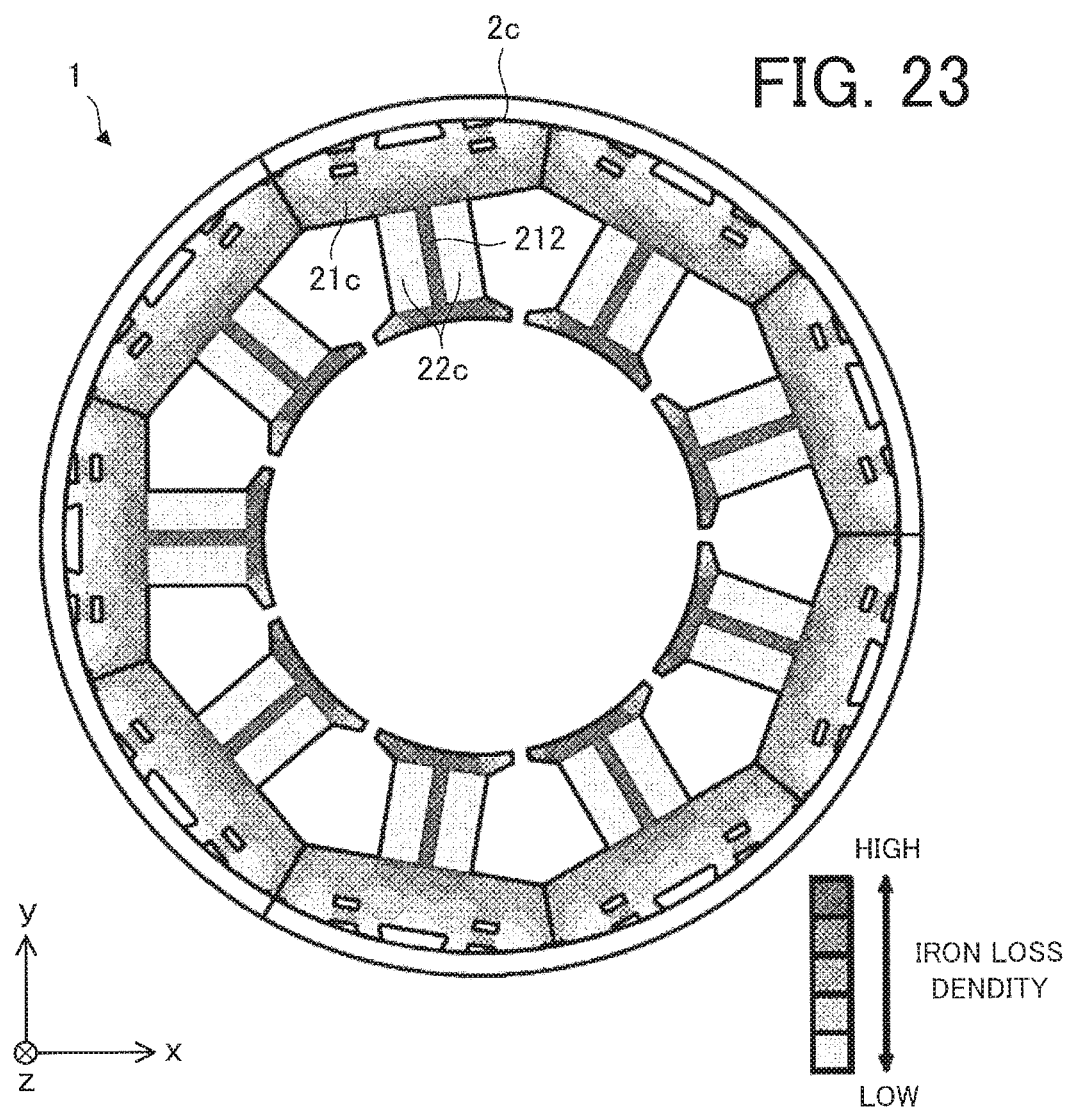
FIG. 23 is a diagram showing the iron loss density in the stator core during driving of the motor including the stator according to the third embodiment.

FIG. 23 is a diagram showing the iron loss density in the stator core 2c during the driving of the motor 1 including the stator according to the third embodiment (during the rotation of the rotor 3).

The first core part 21c (first sheets 210c) of the stator shown in FIG. 23 is formed of non-oriented electromagnetic steel sheets, while the second core part 22c (second sheets 220c) is formed of amorphous metal.

As shown in FIG. 22, in the stator core 102a of the stator 102 according to the comparative example, the iron loss density in the tooth part 212 is extremely high. In contrast, as shown in FIG. 23, in the stator according to the third embodiment, the iron loss density in the tooth part of the stator core 2c (the part formed by the tooth part 212 of the first core part 21c and the second core part 22c) is low. Especially, the iron loss density in the second core part 22c can be lowered.

Figure 24:
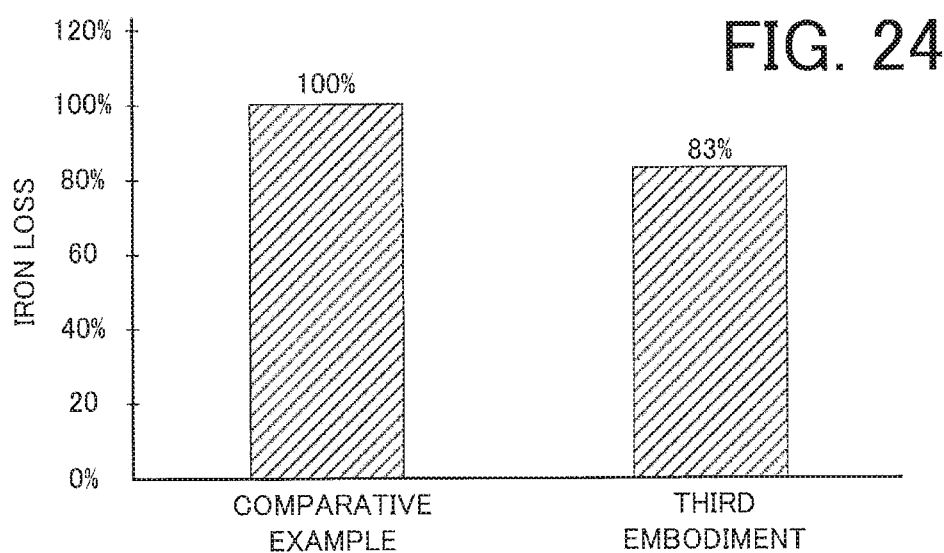
FIG. 24 is a diagram showing the ratio of the iron loss of the stator according to the third embodiment in the state shown in FIG. 23 to the iron loss of the stator (comparative example) in the state shown in FIG. 22.

FIG. 24 is a diagram showing the ratio of the iron loss of the stator core 2c of the stator according to the third embodiment in the state shown in FIG. 23 to the iron loss of the stator core 102a of the stator 102 (comparative example) in the state shown in FIG. 22.

As shown in FIG. 24, assuming that the iron loss of the stator 102 is 100%, the ratio of the iron loss of the stator according to the third embodiment relative to the stator 102 is 83%. Thus, when the stator according to the third embodiment is used, the iron loss can be reduced by 17% compared to the comparative example.

As described above, the stator according to the third embodiment is capable of effectively reducing the iron loss, and the efficiency of the motor 1 can be improved by employing the stator according to the third embodiment.

Further, in the stator according to the third embodiment, the second core part 22c sandwiches the tooth part 212 and is fixed to the first core part 21c. That is, positioning of the second core part 22c is facilitated since the second core part 22c is arranged on both sides of the tooth part 212. Consequently, the production of the stator and the motor 1 can be facilitated.

In the case where the second core part 22c formed in an annular shape is used, the positioning of the second core part 22c is facilitated. Especially, by winding one second sheet 220c around the tooth part 212 of the first core part 21c, the positioning of the second core part 22c is more facilitated, and consequently, the production of the stator according to the third embodiment and the motor 1 can be facilitated.

Fourth Embodiment

Figure 25:
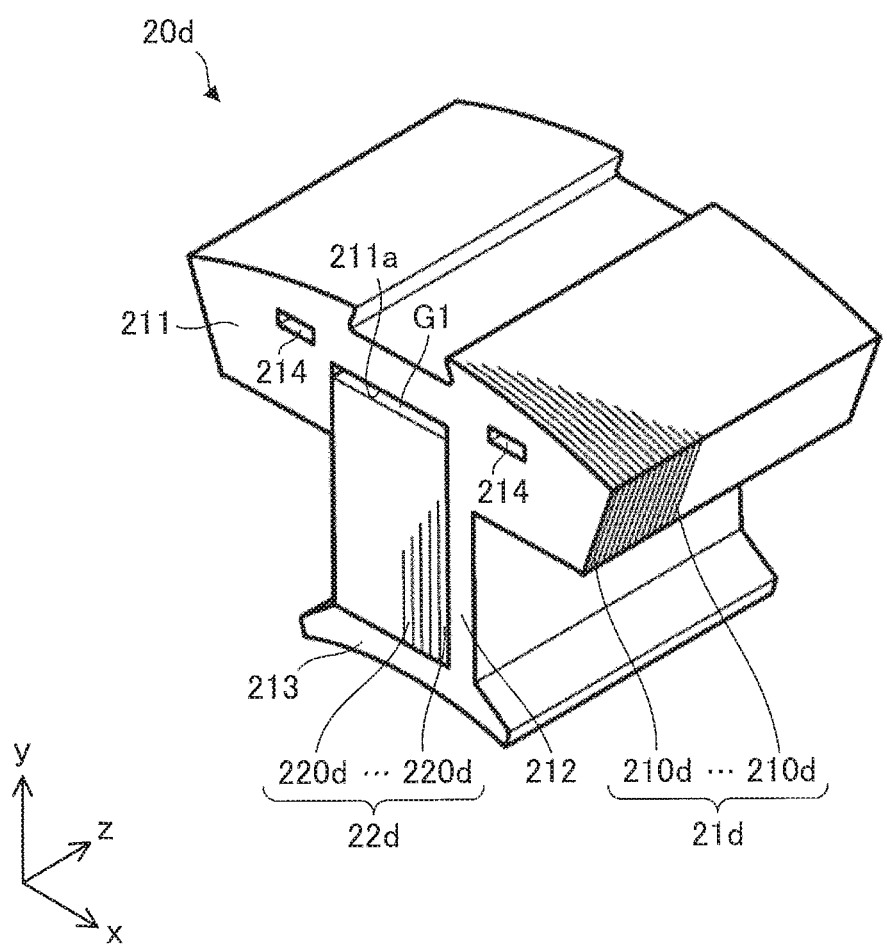
FIG. 25 is a perspective view schematically showing an example of a split stator core of a stator according to a fourth embodiment of the present invention.

FIG. 25 is a perspective view schematically showing an example of a split stator core 20d of a stator according to a fourth embodiment of the present invention.

Figure 26:
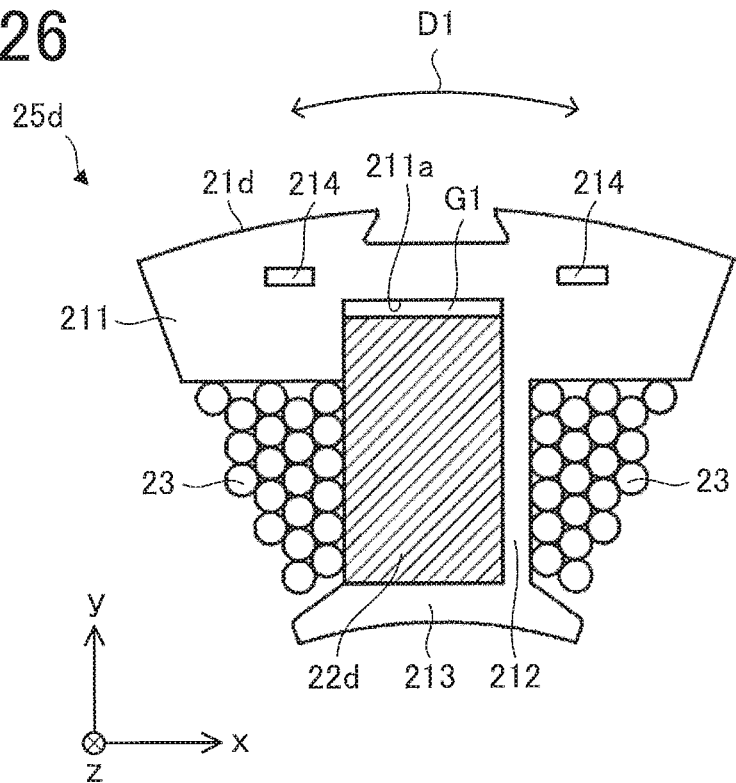
FIG. 26 is a cross-sectional view schematically showing an example of a split core part forming the stator according to the fourth embodiment.

FIG. 26 is a cross-sectional view schematically showing an example of a split core part 25d forming the stator according to the fourth embodiment.

Figure 27:
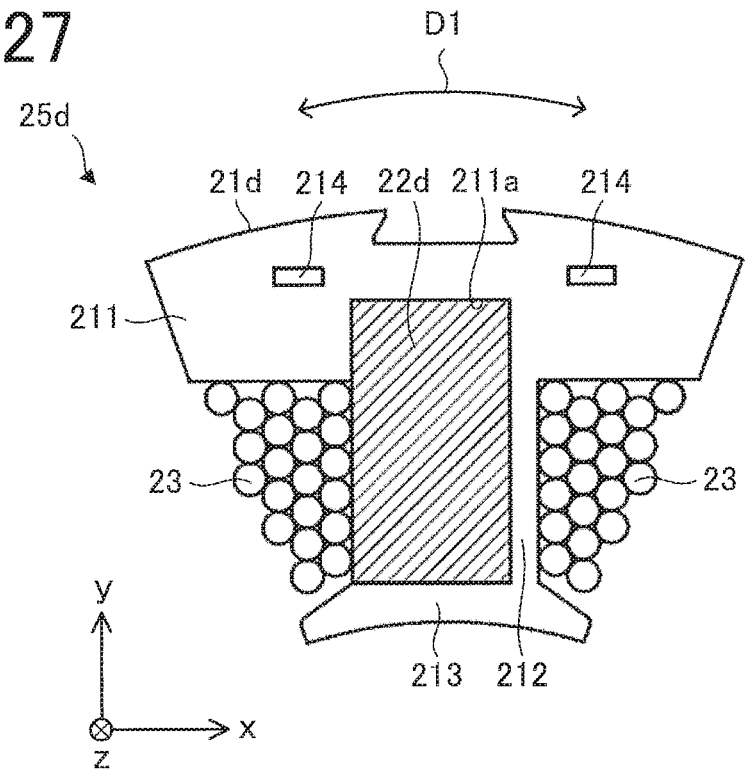
FIG. 27 is a cross-sectional view schematically showing another example of the split core part forming the stator according to the fourth embodiment.

FIG. 27 is a cross-sectional view schematically showing another example of the split core part 25d forming the stator according to the fourth embodiment.

In the fourth embodiment, each component identical or corresponding to a component described in the first embodiment is assigned the same reference character as in the first embodiment.

Compared with the stator 2 according to the first embodiment, the stator according to the fourth embodiment includes the split stator core 20d instead of the split stator core 20a. Specifically, the split stator core 20d includes a first core part 21d instead of the first core part 21a and includes a second core part 22d instead of the second core part 22a. The other features of the stator according to the fourth embodiment are the same as those of the stator 2 according to the first embodiment. The stator according to the fourth embodiment can be applied to the motor 1 in place of the stator 2 according to the first embodiment.

The first core part 21d is formed by at least one first sheet 210d. In this embodiment, the first core part 21d includes a plurality of first sheets 210d stacked in the first direction. While the shape of the first core part 21d differs from that of the first core part 21a of the stator 2 according to the first embodiment, materials for the first core parts 21a and 21d are the same as each other. Namely, the material for the first sheet 210d is the same as that for the first sheet 210a used for the stator 2 according to the first embodiment.

The second core part 22d is formed by at least one second sheet 220d. In this embodiment, the second core part 22d includes a plurality of second sheets 220d stacked in the second direction perpendicular to the first direction. While the shape of the second core part 22d differs from that of the second core part 22a of the stator 2 according to the first embodiment, materials for the second core parts 22a and 22d are the same as each other. Namely, the material for the second sheet 220d is the same as that for the second sheet 220a used for the stator 2 according to the first embodiment.

The yoke part 211 of the first core part 21d has a concave part 211a that is concave in the radial direction (+y direction in FIG. 25). The concave part 211a is formed in a central region of the yoke part 211 of the split stator core 20d in the circumferential direction. The second core part 22d is provided on one side of the first core part 21d (specifically, the tooth part 212) in the circumferential direction. Further, a part of the second core part 22d is provided in the concave part 211a. In the example shown in FIGS. 25 and 26, the second core part 22d in the concave part 211a is separate from the first core part 21d in the radial direction. Accordingly, in the concave part 211a, a gap G1 is formed between the second core part 22d and the first core part 21d.

However, it is permissible even if no gap G1 in the concave part 211a is formed between the second core part 22d and the first core part 21d as shown in FIG. 27.

The stator according to the fourth embodiment has the same advantages as those of the stator 2 according to the first embodiment. Further, the stator according to the fourth embodiment has the following advantages.

In general, the amount of magnetic flux flowing in the yoke part of the stator is smaller than the amount of magnetic flux flowing in the tooth part of the stator, and especially, the central region of the yoke part (the yoke part of the split stator core) in the circumferential direction has little influence on the magnetic properties of the stator (cause little deterioration in the magnetic properties).

Since the winding 23 is wound around the tooth part of the split stator core 20d (the part formed by the tooth part 212 of the first core part 21d and the second core part 22d), the gap between the first core part 21*d* and the second core part 22*d* in the circumferential direction can be reduced. However, in the concave part 211*a*, a gap (e.g., the gap G1) is likely to be formed between the second core part 22*d* and the first core part 21*d*. In this embodiment, the concave part 211*a* is formed in the central region of the yoke part 211 of the split stator core 20*d* in the circumferential direction, and thus the deterioration of the magnetic properties of the stator according to the fourth embodiment can be prevented even in the case where the gap G1 is formed between the second core part 22*d* and the first core part 21*d*.

Further, since the concave part 211*a* is concave in the radial direction, the second core part 22*d* can be formed to be long in the radial direction. Accordingly, in the case where the second core part 22*d* is formed of material with excellent magnetic properties (with low iron loss density) (e.g., amorphous metal or nanocrystal alloy), the iron loss in the part where the iron loss is likely to occur, namely, the tooth part of the split stator core 20*d* (the part formed by the tooth part 212 of the first core part 21*d* and the second core part 22*d*) can be reduced effectively. Consequently, the motor 1 with excellent magnetic properties (motor 1 with high efficiency) can be obtained.

Fifth Embodiment

Figure 28:
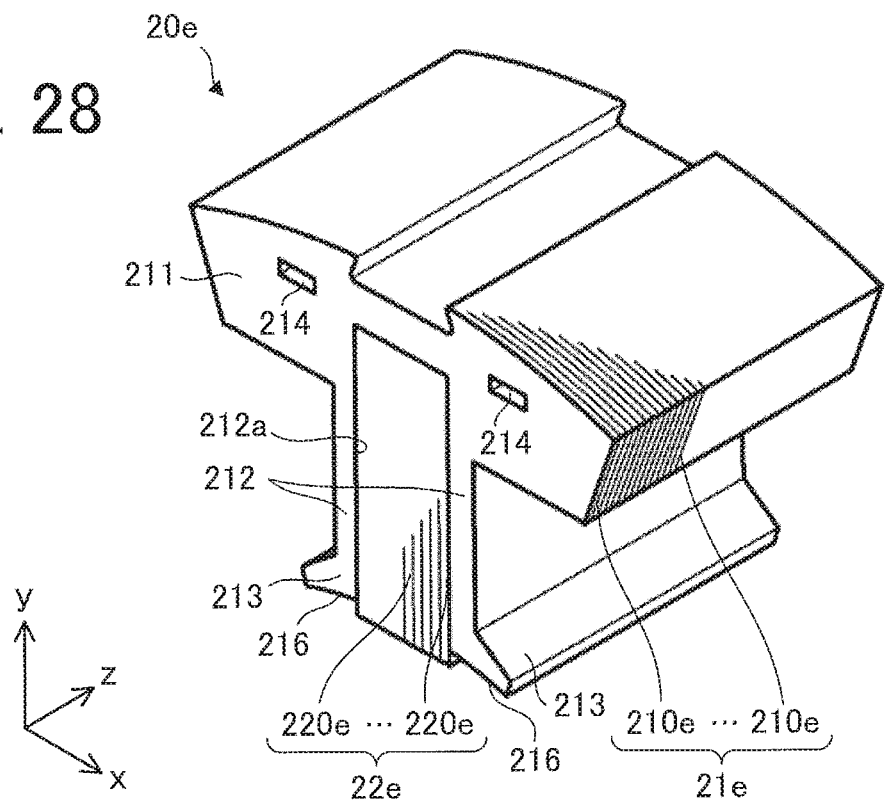
FIG. 28 is a perspective view schematically showing an example of a split stator core of a stator according to a fifth embodiment of the present invention.

FIG. 28 is a perspective view schematically showing an example of a split stator core 20*e* of a stator according to a fifth embodiment of the present invention.

Figure 29:
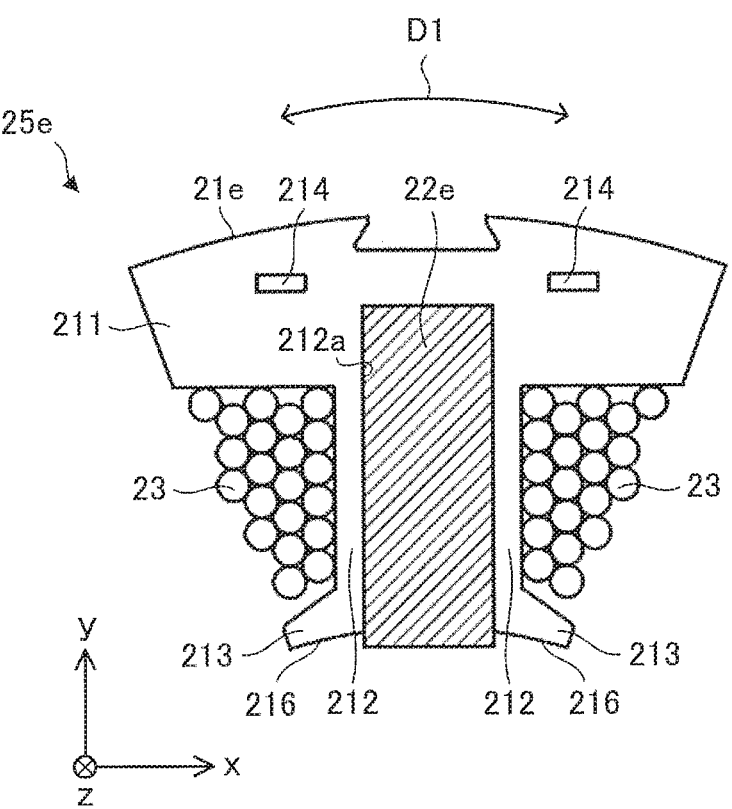
FIG. 29 is a cross-sectional view schematically showing an example of a split core part forming the stator according to the fifth embodiment.

FIG. 29 is a cross-sectional view schematically showing an example of a split core part 25*e* forming the stator according to the fifth embodiment.

Figure 30:
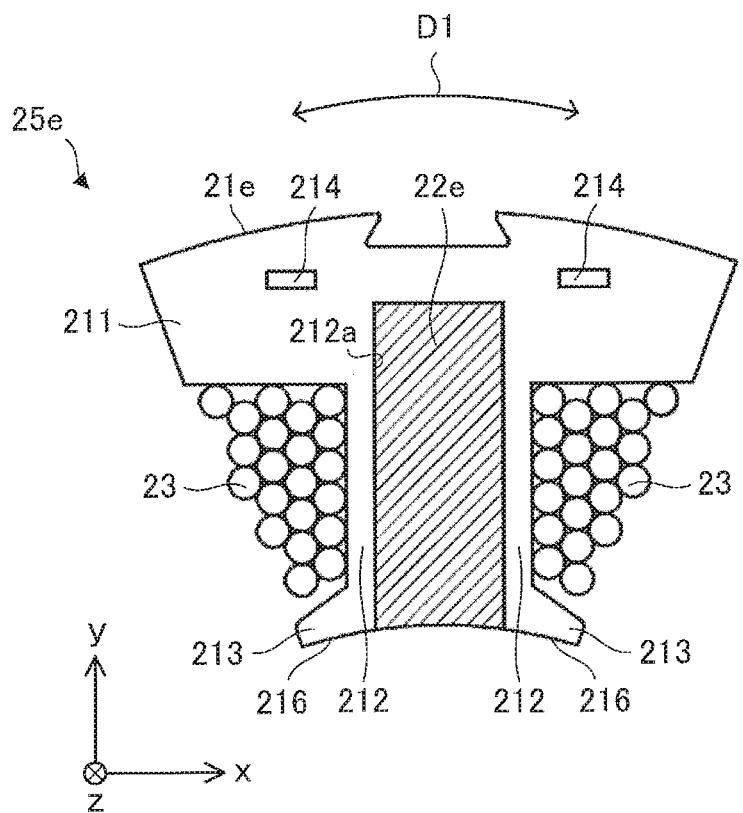
FIG. 30 is a cross-sectional view schematically showing another example of the split core part forming the stator according to the fifth embodiment.

FIG. 30 is a cross-sectional view schematically showing another example of the split core part 25*e* forming the stator according to the fifth embodiment.

In the fifth embodiment, each component identical or corresponding to a component described in the first embodiment is assigned the same reference character as in the first embodiment.

Compared with the stator 2 according to the first embodiment, the stator according to the fifth embodiment includes the split stator core 20*e* instead of the split stator core 20*a*. Specifically, the split stator core 20*e* includes a first core part 21*e* instead of the first core part 21*a* and includes a second core part 22*e* instead of the second core part 22*a*. The other features of the stator according to the fifth embodiment are the same as those of the stator 2 according to the first embodiment. The stator according to the fifth embodiment can be applied to the motor 1 in place of the stator 2 according to the first embodiment.

The first core part 21*e* is formed by at least one first sheet 210*e*. In this embodiment, the first core part 21*e* includes a plurality of first sheets 210*e* stacked in the first direction. While the shape of the first core part 21*e* differs from that of the first core part 21*a* of the stator 2 according to the first embodiment, materials for the first core parts 21*a* and 21*e* are the same as each other. Namely, the material for the first sheet 210*e* is the same as that for the first sheet 210*a* used for the stator 2 according to the first embodiment.

The second core part 22*e* is formed by at least one second sheet 220*e*. In this embodiment, the second core part 22*e* includes a plurality of second sheets 220*e* stacked in the second direction perpendicular to the first direction. While the shape of the second core part 22*e* differs from that of the second core part 22*a* of the stator 2 according to the first embodiment, materials for the second core parts 22*a* and 22*e* are the same as each other. Namely, the material for the second sheet 220*e* is the same as that for the second sheet 220*a* used for the stator 2 according to the first embodiment.

The tooth part 212 has a holding part 212*a* that is concave in the radial direction. The second core part 22*e* is provided on side faces of the first core part 21*e* in regard to the circumferential direction. Specifically, at least a part of the second core part 22*e* is provided in the holding part 212*a*.

In the example shown in FIGS. 28 and 29, one side of the second core part 22*e* in the radial direction is arranged in the holding part 212*a* and the other side of the second core part 22*e* in the radial direction projects in the radial direction compared to an inside surface 216 of the first core part 21*e* in regard to the radial direction. In the example shown in FIGS. 28 and 29, a part of the second core part 22*e* projects in the radial direction compared to the tooth end part 213.

The stator according to the fifth embodiment has the same advantages as those of the stator 2 according to the first embodiment. Further, the stator according to the fifth embodiment has the following advantages.

In the stator according to the fifth embodiment, a part of the second core part 22*e* projects in the radial direction compared to the inside surface 216 of the first core part 21*e* in regard to the radial direction, and thus the second core part 22*e* can be easily thrusted in the radial direction (+y direction in FIG. 28) when the second core part 22*e* is inserted into the holding part 212*a*. Accordingly, the production of the stator according to the fifth embodiment and the motor 1 can be facilitated.

Sixth Embodiment

Figure 31:
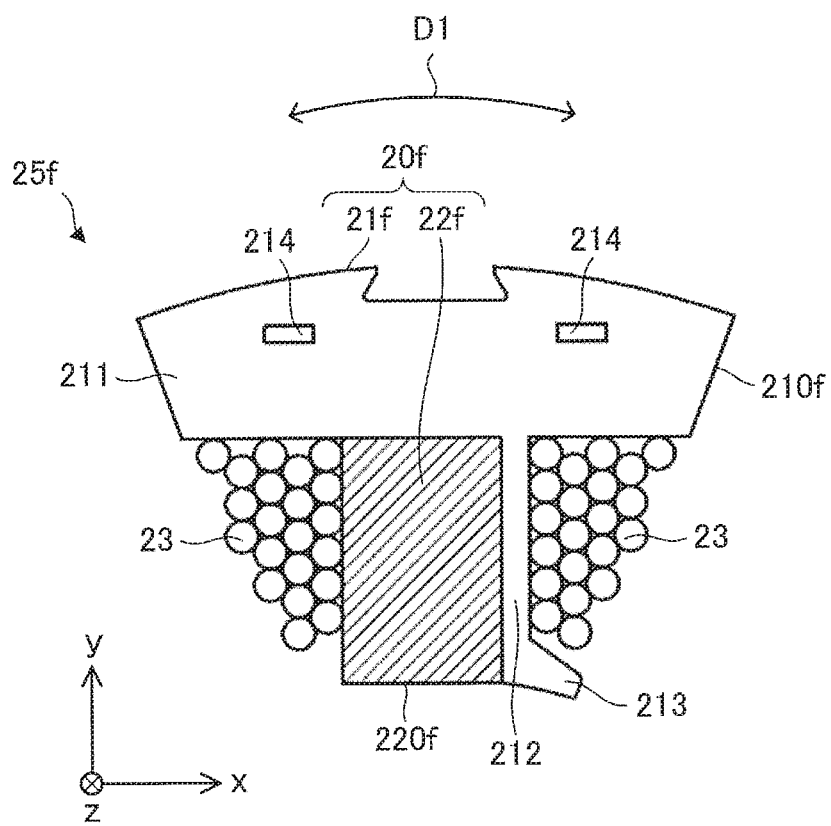
FIG. 31 is a cross-sectional view schematically showing an example of a split core part forming a stator according to a sixth embodiment of the present invention.

FIG. 31 is a cross-sectional view schematically showing an example of a split core part 25*f* forming a stator according to a sixth embodiment of the present invention.

In the sixth embodiment, each component identical or corresponding to a component described in the first embodiment is assigned the same reference character as in the first embodiment.

Compared with the stator 2 according to the first embodiment, the stator according to the sixth embodiment includes a split stator core 20*f* instead of the split stator core 20*a*. Specifically, the split stator core 20*f* includes a first core part 21*f* instead of the first core part 21*a* and includes a second core part 22*f* instead of the second core part 22*a*. The other features of the stator according to the sixth embodiment are the same as those of the stator 2 according to the first embodiment. The stator according to the sixth embodiment can be applied to the motor 1 in place of the stator 2 according to the first embodiment.

The first core part 21*f* is formed by at least one first sheet 210*f*. In this embodiment, the first core part 21*f* includes a plurality of first sheets 210*f* stacked in the first direction. While the shape of the first core part 21*f* differs from that of the first core part 21*a* of the stator 2 according to the first embodiment, materials for the first core parts 21*a* and 21*f* are the same as each other. Namely, the material for the first sheet 210*f* is the same as that for the first sheet 210*a* used for the stator 2 according to the first embodiment.

The second core part 22*f* is formed by at least one second sheet 220*f*. In this embodiment, the second core part 22*f* includes a plurality of second sheets 220*f* stacked in the second direction perpendicular to the first direction. While the shape of the second core part 22*f* differs from that of the second core part 22*a* of the stator 2 according to the first embodiment, materials for the second core parts 22*a* and 22*f* are the same as each other. Namely, the material for the second sheet 220*f* is the same as that for the second sheet 220*a* used for the stator 2 according to the first embodiment.

While the second core part 22*a* in the first embodiment adjoins the tooth end part 213 in the radial direction, the second core part 22*f* in the sixth embodiment adjoins the tooth end part 213 in the circumferential direction. Namely, the second core part 22*f* in the sixth embodiment does not adjoin the tooth end part 213 in the radial direction.

The stator according to the sixth embodiment has the same advantages as those of the stator 2 according to the first embodiment. Further, the stator according to the sixth embodiment has the following advantages.

In the stator according to the sixth embodiment, the second core part 22*f* can be arranged to adjoin the tooth end part 213 in the circumferential direction, and thus positioning of the second core part 22*f* can be facilitated. Consequently, the production of the stator according to the sixth embodiment and the motor 1 can be facilitated.

Seventh Embodiment

A driving device 5 according to a seventh embodiment of the present invention will be described below.

Figure 32:
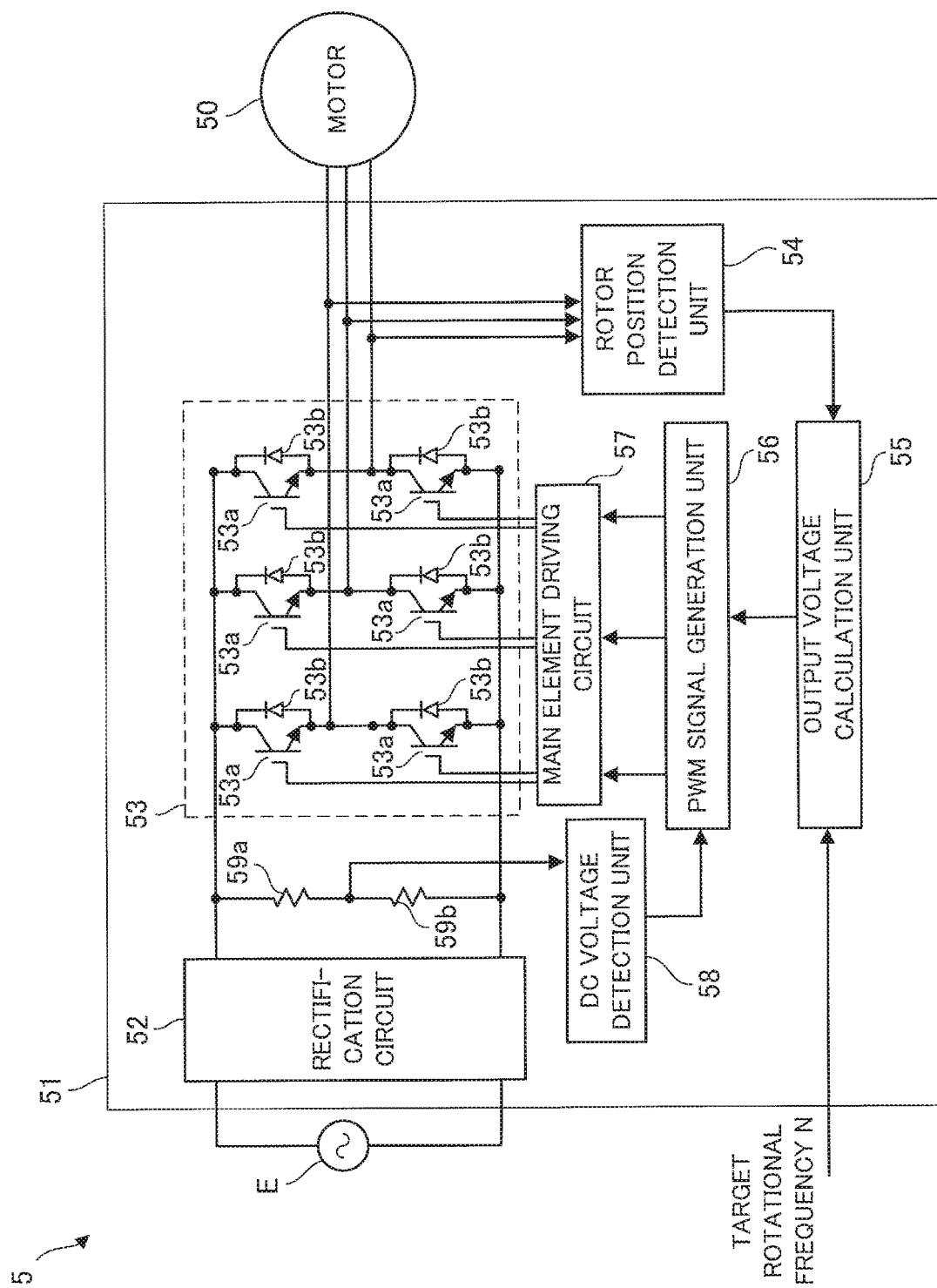
FIG. 32 is a diagram schematically showing a configuration of a driving device according to a seventh embodiment of the present invention.

FIG. 32 is a diagram schematically showing a configuration of the driving device 5.

The driving device 5 includes a motor 50 and a driving circuit 51 that drives the motor 50. The motor 50 is a motor including the stator according to any one of the first to sixth embodiments (e.g., the motor 1 shown in FIG. 1).

The driving circuit 51 is a circuit for driving the motor 50. The motor 50 performs variable speed driving according to PWM (Pulse Width Modulation) control by the driving circuit 51.

AC electric power is supplied to the driving circuit 51 from a commercial AC power source E as an external power source. AC voltage supplied from the commercial AC power source E is converted by a rectification circuit 52 into DC voltage. The rectification circuit 52 includes, for example, a chopper circuit for boosting the voltage supplied from the commercial AC power source E, a smoothing capacitor for smoothing DC voltage, and so forth.

The DC voltage obtained by the conversion by the rectification circuit 52 is converted by an inverter circuit 53 into variable frequency AC voltage and is applied to the motor 50 (e.g., the winding 23 shown in FIG. 1). The motor 50 is driven by the variable frequency AC power supplied from the inverter circuit 53.

The inverter circuit 53 is a three-phase bridge inverter circuit, for example. The inverter circuit 53 includes six IGBTs (Insulated Gate Bipolar Transistors) 53*a* as inverter main elements and six SiC-SBDs (Schottky barrier diodes) 53*b*. In each SiC-SBD 53*b*, silicon carbide (SiC) is used as a free wheeling diode (FRD). The SiC-SBD 53*b* suppresses counter electromotive force that occurs when the IGBT 53*a* switches the current from ON to OFF.

A rotor position detection unit 54 calculates the position of the rotor (e.g., the rotor 3 shown in FIG. 1) of the motor 50 from an output signal from the inverter circuit 53 and outputs rotor position information to an output voltage calculation unit 55. The rotor position detection unit 54 may detect the position of the rotor of the motor 50 by detecting terminal voltage of the motor 50.

The rotor position information obtained by the detection by the rotor position detection unit 54 is outputted to the output voltage calculation unit 55. The output voltage calculation unit 55 calculates optimum output voltage of the inverter circuit 53 to be applied to the motor 50 based on target rotational frequency N given from the outside of the driving circuit 51 and the rotor position information inputted from the rotor position detection unit 54. The output voltage calculation unit 55 outputs a signal associated with the calculation result (output voltage) to a PWM signal generation unit 56.

The PWM signal generation unit 56 outputs a PWM signal according to the signal inputted from the output voltage calculation unit 55 to a main element driving circuit 57. The main element driving circuit 57 drives each IGBT 53*a* of the inverter circuit 53. Each IGBT 53*a* performs the switching according to the PWM signal supplied from the main element driving circuit 57.

Voltage dividing resistors 59*a* and 59*b* are connected in series between the rectification circuit 52 and the inverter circuit 53. A DC voltage detection unit 58 detects and holds an electric signal converted into low voltage by the voltage dividing resistors 59*a* and 59*b*.

The driving device 5 according to the seventh embodiment has the following advantages in addition to the advantages described in the first to sixth embodiments.

In a motor driven by an inverter, the current supplied to the stator generally contains a lot of carrier high-frequency components due to PWM, and thus the iron loss occurring in the motor especially contains eddy current loss at a high ratio. To reduce the eddy current loss, reducing the thickness of each sheet forming the stator core is effective. In this embodiment, the second sheet (e.g., the second sheet 220*a* described in the first embodiment) forming the stator core of the motor 50 can be formed to be thinner than the first sheet (e.g., the first sheet 210*a* described in the first embodiment). For example, as described in the first embodiment, the stator 2 of the motor 1 has structure suitable for the use of amorphous metal or nanocrystal alloy for the stator core 2*a*. Especially, by using amorphous metal as the second sheet, the second sheet can be formed to be thin. Accordingly, the increase in the eddy current loss occurring in the motor 50 due to the inverter drive by the driving device 5 can be inhibited.

Eighth Embodiment

A compressor 6 according to an eighth embodiment of the present invention will be described below.

Figure 33:
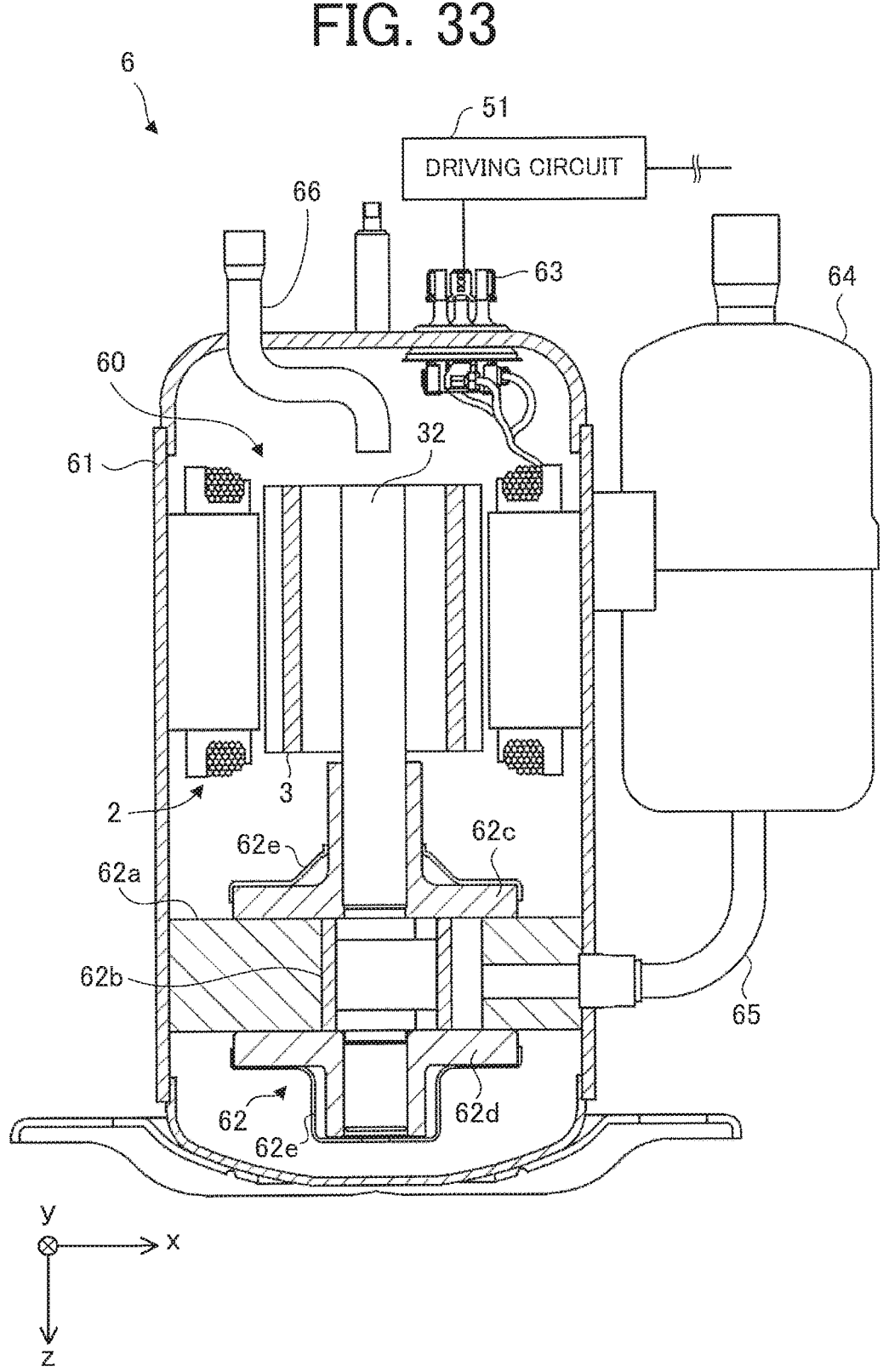
FIG. 33 is a cross-sectional view schematically showing a structure of a compressor according to an eighth embodiment of the present invention.

FIG. 33 is a cross-sectional view schematically showing a structure of the compressor 6 according to the eighth embodiment.

The compressor 6 includes a motor 60 as an electric motor element, a hermetic container 61 as a housing, a compression mechanism 62 as a compression element, and a driving circuit 51 that drives the motor 60. In this embodiment, the compressor 6 is a rotary compressor. However, the compressor 6 is not limited to a rotary compressor.

The motor 60 is a motor including the stator according to any one of the first to sixth embodiments (the motor 1 shown in FIG. 1 in the example shown in FIG. 33). In this embodiment, the motor 60 is a permanent magnet embedded motor, but is not limited to this example.

The hermetic container 61 covers the motor 1 and the compression mechanism 62. Refrigerator oil for lubricating sliding parts of the compression mechanism 62 is stored in a bottom part of the hermetic container 61. The driving circuit 51 is the driving circuit described in the seventh embodiment. Thus, the driving circuit 51 includes the inverter circuit 53 (FIG. 32).

The compressor 6 further includes a glass terminal 63, an accumulator 64, an intake pipe 65 and a discharge pipe 66 that are fixed to the hermetic container 61.

The compression mechanism 62 includes a cylinder 62a, a piston 62b, an upper frame 62c (first frame), a lower frame 62d (second frame), and a plurality of mufflers 62e attached to the upper frame 62c and the lower frame 62d. The compression mechanism 62 further includes a vane that separates the inside of the cylinder 62a into an intake side and a compression side. The compression mechanism 62 is driven by the motor 60.

The stator (e.g., the stator 2 shown in FIG. 1) of the motor 60 is directly mounted in the hermetic container 61 by means of shrink fitting, welding or the like, for example. Thus, when the motor 1 described in the first embodiment is used as the motor 60, for example, the first core part 21a of the stator core 2a is in contact with the hermetic container 61, while the second core part 22a is not in contact with the hermetic container 61.

To the coil (e.g., the winding 23 shown in FIG. 1) of the stator of the motor 60, electric power is supplied via the glass terminal 63.

The rotor of the motor 60 (specifically, the shaft 32 of the rotor 3 shown in FIG. 5) is rotatably held by the upper frame 62c and the lower frame 62d via bearing parts respectively provided in the upper frame 62c and the lower frame 62d.

Into the piston 62b, the shaft 32 has been inserted. Into the upper frame 62c and the lower frame 62d, the shaft 32 has been inserted to be rotatable. The upper frame 62c and the lower frame 62d occlude ends of the cylinder 62a. The accumulator 64 supplies the refrigerant (e.g., refrigerant gas) to the cylinder 62a via the intake pipe 65.

Next, the operation of the compressor 6 will be described below. The refrigerant supplied from the accumulator 64 is taken into the cylinder 62a via the intake pipe 65 fixed to the hermetic container 61. The motor 60 is rotated when an inverter (e.g., the inverter circuit 53 shown in FIG. 32) is energized, and thus the piston 62b fitted on the shaft 32 is rotated in the cylinder 62a. By this operation, the compression of the refrigerant is carried out in the cylinder 62a.

The refrigerant flows through the mufflers 62e and ascends in the hermetic container 61. At that time, the refrigerator oil has mixed into the compressed refrigerant. When the mixture of the refrigerant and the refrigerator oil passes through the air holes 36 formed through the rotor core 31, separation between the refrigerant and the refrigerator oil is promoted, by which inflow of the refrigerator oil into the discharge pipe 66 can be prevented. The refrigerant compressed as above is supplied to a high-pressure side of a refrigeration cycle through the discharge pipe 66.

As the refrigerant of the compressor 6, R410A, R407C, R22 or the like is usable. However, the refrigerant of the compressor 6 is not limited to these examples. For example, a low GWP (Global Warming Potential) refrigerant or the like is usable as the refrigerant of the compressor 6.

Typical examples of the low GWP refrigerant include the following refrigerants:

(1) Halogenated hydrocarbon containing a carbon double bond in the composition, e.g., HFO-1234yf ($CF_3CF=CH_2$). HFO is an abbreviation for hydro-fluoro-olefin. Olefin means an unsaturated hydrocarbon having one double bond. The GWP of HFO-1234yf is 4.

(2) Hydrocarbon containing a carbon double bond in the composition, e.g., R1270 (propylene). The GWP of R1270 which is 3 is lower than the GWP of HFO-1234yf, but flammability of R1270 is higher than that of HFO-1234yf.

(3) A mixture containing at least either of a halogenated hydrocarbon containing a carbon double bond in the composition and a hydrocarbon containing a carbon double bond in the composition, e.g., a mixture of HFO-1234yf and R32. HFO-1234yf is a low-pressure refrigerant, and thus the pressure loss is great and the performance of the refrigeration cycle tends to deteriorate (especially in the evaporator). Thus, it is desirable to use a mixture with a high-pressure refrigerant such as R32 or R41.

The compressor 6 according to the eighth embodiment has the following advantage in addition to the advantages described in the first to seventh embodiments.

The compressor 6 according to the eighth embodiment includes the motor 60 with high efficiency, and thus the compressor 6 with high compression efficiency (ratio between the actual amount of work necessary for compressing the refrigerant and a theoretically obtained amount of work) can be provided.

Ninth Embodiment

A refrigeration air conditioner 7 including the compressor 6 according to the eight embodiment will be described below.

Figure 34:
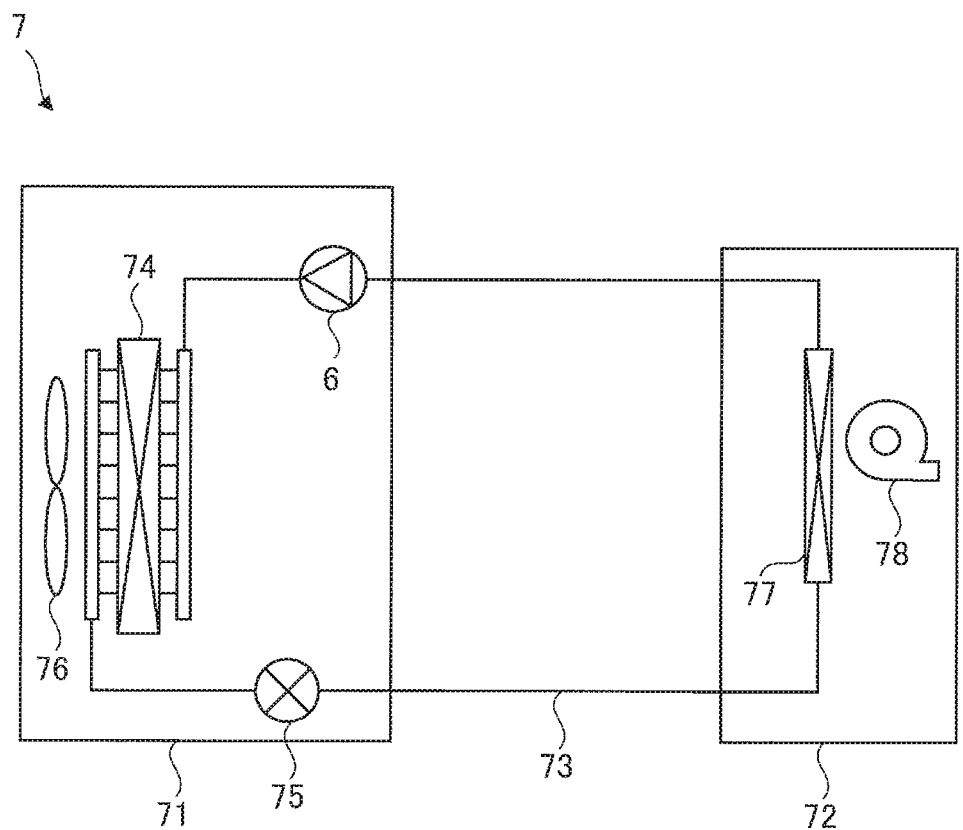
FIG. 34 is a diagram schematically showing a configuration of a refrigeration air conditioner according to a ninth embodiment of the present invention.

FIG. 34 is a diagram schematically showing a configuration of the refrigeration air conditioner 7 according to a ninth embodiment of the present invention.

The refrigeration air conditioner 7 is an air conditioner capable of cooling and heating operations, for example. The refrigerant circuit diagram shown in FIG. 34 is an example of a refrigerant circuit diagram of an air conditioner capable of cooling operation.

The refrigeration air conditioner 7 according to the ninth embodiment includes an outdoor unit 71, an indoor unit 72, and refrigerant piping 73 that connects the outdoor unit 71 and the indoor unit 72, thereby forming a refrigerant circuit (refrigeration circuit).

The outdoor unit 71 includes the compressor 6, a condenser 74, a throttle device 75 and an outdoor blower 76 (first blower). The condenser 74 condenses the refrigerant compressed by the compressor 6. The throttle device 75 regulates the flow rate of the refrigerant by decompressing the refrigerant condensed by the condenser 74.

The indoor unit 72 includes an evaporator 77 and an indoor blower 78 (second blower). The evaporator 77 evaporates the refrigerant decompressed by the throttle device 75 and thereby cools down indoor air.

Basic operation of the refrigeration air conditioner 7 for the cooling operation will be described below. In the cooling operation, the refrigerant is compressed by the compressor 6 and flows into the condenser 74. The refrigerant is condensed by the condenser 74 and the condensed refrigerant flows into the throttle device 75. The refrigerant is decompressed by the throttle device 75 and the decompressed refrigerant flows into the evaporator 77. The refrigerant is evaporated in the evaporator 77 into refrigerant gas and flows into the compressor 6 of the outdoor unit 71 again. The outdoor blower 76 sends outdoor air to the condenser 74 while the indoor blower 78 sends indoor air to the evaporator 77, by which heat is exchanged between the refrigerant and air.

The configuration and the operation of the refrigeration air conditioner 7 described above are just an example and are not limited to the above-described example.

The refrigeration air conditioner 7 according to the ninth embodiment has the following advantage in addition to the advantages described in the first to eighth embodiments.

The refrigeration air conditioner 7 according to the ninth embodiment includes the compressor 6 with high compression efficiency, and thus the refrigeration air conditioner 7 with high efficiency can be provided.

Features in the embodiments which have been described above can be appropriately combined with each other.

While preferred embodiments have been specifically described as above, it is obvious that those skilled in the art can employ a variety of modified modes based on the fundamental technical ideas and teachings of the present invention.

What is claimed is:

1. A stator comprising:
a stator core including a first core part formed by at least one first sheet and a second core part provided on a side face of the first core part and formed by at least one second sheet; and
a winding wound around an outer periphery of the first core part and the second core part, wherein
the first core part includes a yoke part and a tooth part, and the second core part adjoins the tooth part in a circumferential direction, wherein
the at least one first sheet includes a plurality of first sheets, and the plurality of first sheets are stacked in a first direction, wherein
the at least one second sheet includes a plurality of second sheets, and the plurality of second sheets are stacked in a second direction perpendicular to the first direction.

2. The stator according to claim 1, wherein the second core part adjoins the first core part in a circumferential direction.

3. The stator according to claim 1, wherein the second core part is provided on one side of the tooth part in the circumferential direction.

4. The stator according to claim 1, wherein the yoke part has a concave part that is concave in a radial direction, and a part of the second core part is provided in the concave part.

5. The stator according to claim 1, wherein the first core part includes a tooth end part formed at a tip end of the first core part in a radial direction.

6. The stator according to claim 5, wherein the second core part adjoins the tooth end part in the circumferential direction.

7. The stator according to claim 1, wherein the at least one first sheet is an electromagnetic steel sheet.

8. The stator according to claim 1, wherein the at least one second sheet is formed of amorphous metal or nanocrystal alloy.

9. A motor comprising a rotor and the stator according to claim 1.

10. The motor according to claim 9, wherein the second core part is arranged on a downstream side of the first core part in a rotation direction of the rotor.

11. The motor according to claim 9, wherein an area of the second core part provided on a downstream side of the first core part in a rotation direction of the rotor in a plane perpendicular to an axial direction is larger than an area of the second core part provided on an upstream side of the first core part in the rotation direction of the rotor in the plane perpendicular to the axial direction.

12. A driving device comprising a motor and a driving circuit that drives the motor, wherein
the motor includes a rotor and the stator according to claim 1.

13. A compressor comprising:
a motor;
a compression mechanism driven by the motor;
a driving circuit to drive the motor; and
a housing covering the motor and the compression mechanism, wherein the motor includes a rotor and the stator according to claim 1.

14. A refrigeration air conditioner comprising an indoor unit and an outdoor unit connected to the indoor unit, wherein
at least one of the indoor unit and the outdoor unit includes a motor,
the motor includes a rotor and the stator according to claim 1.

15. A stator comprising:
a stator core including a first core part formed by at least one first sheet and a second core part provided on a side face of the first core part and formed by at least one second sheet; and
a winding wound around an outer periphery of the first core part and the second core part, wherein
the first core part includes a yoke part and a tooth part, and
the second core part adjoins the tooth part in a circumferential direction, the second core part is provided on both sides of the tooth part in the circumferential direction, wherein
the second core part is formed in a shape of a U-shape.

16. A stator comprising:
a stator core including a first core part formed by at least one first sheet and a second core part provided on a side face of the first core part and formed by at least one second sheet; and
a winding wound around an outer periphery of the first core part and the second core part, wherein
the first core part includes a yoke part and a tooth part, and
the second core part adjoins the tooth part in a circumferential direction, the second core part is provided on both sides of the tooth part in the circumferential direction, wherein
the second core part is formed in an annular shape.

17. A stator comprising:
a stator core including a first core part formed by at least one first sheet and a second core part provided on a side face of the first core part and formed by at least one second sheet; and
a winding wound around an outer periphery of the first core part and the second core part, wherein
the first core part includes a yoke part and a tooth part, and
the second core part adjoins the tooth part in a circumferential direction, the second core part is provided on both sides of the tooth part in the circumferential direction, wherein
the stator core includes a first region that is a region adjoining one side face of the first core part in the circumferential direction and a second region that is a region adjoining the other side face of the first core part in the circumferential direction,
the tooth part projects in a direction perpendicular to an axial direction, and
an area of the second core part provided in the first region in a plane perpendicular to the axial direction is larger than an area of the second core part provided in the second region in the plane perpendicular to the axial direction.

18. A stator comprising:
a stator core including a first core part formed by at least one first sheet and a second core part provided on a side face of the first core part and formed by at least one second sheet; and a winding wound around an outer periphery of the first core part and the second core part, wherein
the first core part includes a yoke part and a tooth part, and
the second core part adjoins the tooth part in a circumferential direction, wherein
a boundary part between the yoke part and the tooth part is formed in a shape of a circular arc, and the second core part adjoins the boundary part.

19. A stator comprising:
a stator core including a first core part formed by at least one first sheet and a second core part provided on a side face of the first core part and formed by at least one second sheet; and
a winding wound around an outer periphery of the first core part and the second core part, wherein
the first core part includes a yoke part and a tooth part, and
the second core part adjoins the tooth part in a circumferential direction, wherein
the tooth part has a holding part that is concave in a radial direction, and at least a part of the second core part is provided in the holding part, wherein
one side of the second core part in the radial direction is arranged in the holding part, and the other side of the second core part in the radial direction projects in the radial direction compared to an inside surface of the first core part in regard to the radial direction.

20. A method of producing a stator including a winding and a stator core having a first core part and a second core part, the first core part having a yoke part and a tooth part, the method comprising:
forming the first core part with a plurality of first sheets;
forming the second core part with a plurality of second sheets; and
fixing the second core part on a side face of the tooth part of the first core part in a circumferential direction by winding the winding, wherein
the plurality of first sheets are stacked in a first direction, wherein
the plurality of second sheets are stacked in a second direction perpendicular to the first direction.

* * * * *